US012797819B2

(12) United States Patent
Alden et al.

(10) Patent No.: US 12,797,819 B2
(45) Date of Patent: Nov. 17, 2026

(54) ADSORBENT MATERIAL FOR REDUCING HYDROCARBON BLEED EMISSION IN AN EVAPORATIVE EMISSION CONTROL SYSTEM

(71) Applicant: BASF CORPORATION, Florham Park, NJ (US)

(72) Inventors: Laif R. Alden, Iselin, NJ (US); Wolfgang Ruettinger, Iselin, NJ (US); Steven Wesley Chin, Iselin, NJ (US); Gerard Diomede Lapadula, Iselin, NJ (US); Ahmad Moini, Iselin, NJ (US)

(73) Assignee: BASF Mobile Emissions Catalysts LLC, Iselin, NJ (US)

( * ) Notice: Subject to any disclaimer, the term of this patent is extended or adjusted under 35 U.S.C. 154(b) by 500 days.

(21) Appl. No.: 17/604,668

(22) PCT Filed: Apr. 6, 2020

(86) PCT No.: PCT/US2020/026830

§ 371 (c)(1),
(2) Date: Oct. 18, 2021

(87) PCT Pub. No.: WO2020/214445

PCT Pub. Date: Oct. 22, 2020

(65) Prior Publication Data

US 2022/0212161 A1 Jul. 7, 2022

Related U.S. Application Data

(60) Provisional application No. 62/836,121, filed on Apr. 19, 2019.

(51) Int. Cl.
*B01J 20/18* (2006.01)
*B01D 53/04* (2006.01)
(Continued)

(52) U.S. Cl.
CPC .......... *B01J 20/18* (2013.01); *B01D 53/0407* (2013.01); *B01J 20/28004* (2013.01);
(Continued)

(58) Field of Classification Search
CPC .................. B01J 20/18; B01J 20/28004; B01J 20/28042; B01J 20/2803; B01J 20/2808;
(Continued)

(56) References Cited

U.S. PATENT DOCUMENTS 4,308,841 A 1/1982 Kingsley
4,750,465 A 6/1988 Rediker et al.
(Continued)

FOREIGN PATENT DOCUMENTS

CN 102052713 5/2011
CN 103573342 2/2014
(Continued)

OTHER PUBLICATIONS

Rotella et al., "Fabrication and characterization of zeolite coatings on aluminum and magnesium alloys", Engineering Science and Technology, an International Journal 23 (2020) 1273-1278.*
(Continued)

*Primary Examiner* — Guinever S Gregorio
(74) *Attorney, Agent, or Firm* — Lowenstein Sandler LLP

(57) ABSTRACT

Disclosed in certain embodiments are hydrocarbon adsorbents and evaporative emission control systems incorporating the same to reduce hydrocarbon bleed emissions from fuel systems. In one embodiment, a hydrocarbon adsorbent structure comprises a zeolite having a silica-to-alumina ratio of at least 20.

13 Claims, 8 Drawing Sheets

(51) Int. Cl.
*B01J 20/28* (2006.01)
*B01J 20/32* (2006.01)

(52) U.S. Cl.
CPC ..... *B01J 20/2803* (2013.01); *B01J 20/28042* (2013.01); *B01J 20/2808* (2013.01); *B01J 20/3238* (2013.01); *B01D 2253/102* (2013.01); *B01D 2253/1085* (2013.01); *B01D 2253/25* (2013.01); *B01D 2253/304* (2013.01); *B01D 2253/308* (2013.01); *B01D 2253/342* (2013.01); *B01D 2257/7022* (2013.01); *B01D 2259/4516* (2013.01); *B01D 2259/4566* (2013.01)

(58) Field of Classification Search
CPC ...... B01J 20/3238; B01J 35/00; B01J 35/643; B01J 37/0045; B01J 37/0215; B01J 37/0221; B01J 2229/42; F02M 25/089; F02M 25/0854; B01D 53/02; B01D 53/04; B01D 53/0407; B01D 2259/4516; B01D 2259/4566; B01D 2257/702; B01D 2257/7022; B01D 2253/102; B01D 2253/1085; B01D 2253/25; B01D 2253/304; B01D 2253/308
USPC ............... 502/400, 407, 416, 414, 439, 526, 502/527.17, 527.24
See application file for complete search history.

(56) References Cited

U.S. PATENT DOCUMENTS

| | | | |
|---|---|---|---|
| 4,877,001 | A | 10/1989 | Kenealy et al. |
| 5,125,231 | A * | 6/1992 | Patil ...................... F01N 13/009 422/171 |
| 5,914,294 | A | 6/1999 | Park et al. |
| RE38,844 | E | 10/2005 | Hiltzik et al. |
| 7,442,232 | B2 | 10/2008 | White et al. |
| 7,467,620 | B1 | 12/2008 | Reddy |
| 7,531,029 | B2 | 5/2009 | Hoke et al. |
| 7,540,904 | B2 | 6/2009 | Hoke et al. |
| 7,578,285 | B2 | 8/2009 | Buelow et al. |
| 7,677,226 | B2 | 3/2010 | Buelow et al. |
| 7,753,034 | B2 | 7/2010 | Hoke et al. |
| 8,652,429 | B2 * | 2/2014 | Sumiya .................. B01J 29/068 60/299 |
| 9,732,649 | B2 | 8/2017 | Hiltzik et al. |
| 10,323,553 | B2 | 6/2019 | Hiltzik et al. |
| 2006/0205830 | A1 | 9/2006 | Lebowitz et al. |
| 2007/0107701 | A1 | 5/2007 | Buelow et al. |
| 2013/0190542 | A1 | 7/2013 | Romanos et al. |
| 2015/0275727 | A1 | 10/2015 | Hiltzik et al. |
| 2015/0360213 | A1 * | 12/2015 | Bergeal ................ B01D 53/944 422/171 |
| 2016/0367963 | A1 * | 12/2016 | Cavataio .............. B01J 37/0215 |
| 2018/0043329 | A1 | 2/2018 | Mazyck et al. |
| 2018/0363594 | A1 | 12/2018 | Byrne et al. |
| 2019/0127227 | A1 | 5/2019 | Zhao et al. |
| 2019/0224657 | A1 * | 7/2019 | Fedeyko ................ B01J 37/036 |
| 2020/0018265 | A1 | 1/2020 | Chen et al. |
| 2020/0147586 | A1 | 5/2020 | Ruettinger et al. |
| 2021/0245135 | A1 | 8/2021 | Ruettinger et al. |
| 2021/0387159 | A1 | 12/2021 | Ruettinger et al. |

FOREIGN PATENT DOCUMENTS

| | | |
|---|---|---|
| CN | 103925051 | 7/2014 |
| CN | 107282011 | 10/2017 |
| EP | 2063098 | 5/2009 |
| WO | 2004/101115 | 11/2004 |
| WO | 2007/061662 | 5/2007 |

OTHER PUBLICATIONS

"California Evaporative Emission Standards and Test Procedures for 2001 and Subsequent Model Motor Vehicles," State of California Air Resources Board, adopted Aug. 5, 1999, amended Mar. 22, 2012, 93 pages.
Petition for Post Grant Review of U.S. Pat. No. 10,323,553 dated Mar. 2, 2020, AIA Review No. PGR2020-00035, 110 pages.
Ingevity South Carolina, LLC's Patent Owner's Preliminary Response dated Jun. 12, 2020, AIA Review No. PGR2020-00035, 91 pages.
Petitioner's Reply to Patent Owner's Preliminary Response dated Jul. 23, 2020, AIA Review No. PGR2020-00035, 10 pages.
Patent Owner Ingevity South Carolina, LLC's Sur-Reply dated Jul. 30, 2020, AIA Review No. PGR2020-00035, 6 pages.
Decision Denying Institution of Post-Grant Review, dated Sep. 10, 2020, AIA Review No. PGR2020-00035, 25 pages.
Petition for Post Grant Review of U.S. Pat. No. 10,323,553 dated Mar. 3, 2020, AIA Review No. PGR2020-00037, 118 pages.
Ingevity South Carolina, LLC's Patent Owner's Preliminary Response dated Jun. 12, 2020, AIA Review No. PGR2020-00037, 97 pages.
Petitioner's Reply to Patent Owner's Preliminary Response dated Jul. 31, 2020, AIA Review No. PGR2020-00037, 14 pages.
Patent Owner Ingevity South Carolina, LLC's Sur-Reply dated Aug. 7, 2020, AIA Review No. PGR2020-00037, 10 pages.
Decision Granting Institution of Post-Grant Review, dated Sep. 10, 2020, AIA Review No. PGR2020-00037, 42 pages.
International Search Report and Written Opinion for International Application No. PCT/CN2019/095842 dated Oct. 15, 2019, 8 pages.
International Search Report and Written Opinion for International Application No. PCT/US2020/026830 dated Jul. 17, 2020, 17 pages.

* cited by examiner

ADSORBENT MATERIAL FOR REDUCING HYDROCARBON BLEED EMISSION IN AN EVAPORATIVE EMISSION CONTROL SYSTEM

CROSS-REFERENCE TO RELATED APPLICATION(S)

The present application is a national stage entry under 35 U.S.C. § 371 of International Application No. PCT/US2020/026830, filed on Apr. 6, 2020, which claims the benefit of priority of U.S. Provisional Patent Application No. 62/836,121, filed on Apr. 19, 2019, the disclosures of which are hereby incorporated by reference herein in their entireties.

TECHNICAL FIELD

The present disclosure relates generally to hydrocarbon emission control systems, devices, and compositions for use in the same. More particularly, the present disclosure relates to substrates coated with hydrocarbon adsorptive coating compositions, evaporative emission control system components, and evaporative emission control systems for controlling evaporative emissions of hydrocarbons from motor vehicle engines and fuel systems.

BACKGROUND

Evaporative loss of gasoline fuel from the fuel systems of motor vehicles powered by internal combustion engines is a major potential contributor to atmospheric air pollution by hydrocarbons. Evaporative emissions are defined as emissions that do not originate from the exhaust system of the vehicle. The main contribution to the overall evaporative emissions of a vehicle is hydrocarbon fuel vapors originating from the fuel system and the air intake system. Canister systems that employ activated carbon to adsorb the fuel vapor emitted from the fuel systems are used to limit such evaporative emissions. Currently, all vehicles have a fuel vapor canister to control evaporative emissions. Activated carbon is the standard adsorbent material used in automotive evaporative emission control technologies, which typically make use of the activated carbon as an adsorbent material to temporarily adsorb the hydrocarbons.

Many fuel vapor canisters also contain an additional control device to capture fuel vapors that escape from the carbon bed during the hot side of diurnal temperature cycling. Current control devices for such emissions contain exclusively carbon-containing honeycomb adsorbents for pressure drop reasons. In such systems, the adsorbed fuel vapor is periodically removed from the activated carbon by purging the canister systems with fresh ambient air, desorbing the fuel vapor from the activated carbon and thereby regenerating the carbon for further adsorption of fuel vapor.

Institution of strict regulations for permissible quantities of hydrocarbon emissions have required progressively tighter control of the quantity of hydrocarbon emissions from motor vehicles, even during periods of disuse. During such periods (i.e., when parked), vehicle fuel systems may be subject to warm environments, which result in increased vapor pressure in the fuel tank and, consequently, the potential for evaporative loss of fuel to the atmosphere.

The aforementioned canister systems possess certain limitations in regard to capacity and performance. For example, purge air does not desorb the entire fuel vapor adsorbed on the adsorbent volume, resulting in residual hydrocarbons ("heel") that may be emitted to the atmosphere. The term "heel" as used herein refers to residual hydrocarbons generally present on an adsorbent material when the canister is in a purged or "clean" state and may result in a reduction of the adsorption capacity of the adsorbent.

Bleed emissions, on the other hand, refer to emissions that escape from the adsorbent material. Bleed can occur, for example, when the equilibrium between adsorption and desorption favors desorption significantly over adsorption. Such emissions can occur when a vehicle has been subjected to diurnal temperature changes over a period of several days, commonly called "diurnal breathing losses." Certain regulations make it desirable for these diurnal breathing loss (DBL) emissions from the canister system to be maintained at very low levels. For example, as of Mar. 22, 2012, California Low Emission Vehicle Regulation (LEV III) requires canister DBL emissions for 2001 and subsequent model motor vehicles not to exceed 20 mg as per the Bleed Emissions Test Procedure (BETP).

Stricter regulations on DBL emissions continue to prompt development of improved evaporative emission control systems, particularly for use in vehicles with reduced purge volumes (i.e., hybrid vehicles). Such vehicles may otherwise produce high DBL emissions due to lower purge frequency, which equates to lower total purge volume and higher residual hydrocarbon heel. Accordingly, it is desirable to have an evaporative emission control system with low DBL emissions despite low volume and/or infrequent purge cycles. Further, there remains a need for evaporative emission control systems with high efficiency to reduce space requirements and weight while further reducing the quantity of potential evaporative emissions under a variety of conditions.

SUMMARY OF THE DISCLOSURE

The following presents a simplified summary of various aspects of the present disclosure in order to provide a basic understanding of such aspects. This summary is not an extensive overview of the disclosure. It is intended to neither identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

In one aspect of the present disclosure, a hydrocarbon adsorbent structure (e.g., which may be adapted for reducing evaporative emissions in a vehicle) comprises a zeolite having a silica-to-alumina ratio of at least 20. The repeatable TGA butane adsorption of the zeolite is greater than 2 wt. %.

In some embodiments, the silica-to-alumina ratio is at least 30, at least 50, at least 100, at least 150, at least 200, at least 250, at least 300, at least 350, at least 400, at least 450, or at least 500. In some embodiments, the silica to alumina ratio is in the range of from 20 to 600. In some embodiments, the repeatable TGA butane adsorption of the zeolite is greater than 3 wt. %, greater than 4 wt. %, or greater than 5 wt. %. In some embodiments, an average pore width of micropores of the zeolite is less than 20 Å. In some embodiments, the average pore width of the zeolite is between 2.0 and 6.7 Å. In some embodiments, the zeolite is in the form of characterized by an average d90 particle size from about 5 micrometers to about 50 micrometers, from about 10 micrometers to about 25 micrometers, or from about 15 micrometers to about 20 micrometers.

In some embodiments, the zeolite comprises a zeolite selected from a group consisting of: AEI, BEA, BEC, CHA, EMT, FAU, FER, MFI, and combinations thereof. In some embodiments, the zeolite comprises BEA zeolite. In some embodiments, the zeolite comprises MFI zeolite.

In some embodiments, the hydrocarbon adsorbent structure comprises a substrate and a hydrocarbon adsorbent coating formed thereon, the hydrocarbon adsorbent coating comprising the zeolite. In some embodiments, the substrate comprises a ceramic monolith. In some embodiments, the a loading of the hydrocarbon adsorbent coating on the substrate ranges from about 0.5 g/in$^3$ to about 2.0 g/in$^3$, from 0.5 g/in$^3$ to about 1 g/in$^3$, or from about 1 g/in$^3$ to about 2 g/in$^3$. In some embodiments, a thickness of the hydrocarbon adsorbent coating is less than about 500 micrometers. In some embodiments, the hydrocarbon adsorbent coating comprises a binder. In some embodiments, the binder comprises a styrene/acrylic copolymer. In some embodiments, the binder is present in an amount from about 5 wt. % to about 50 wt. %, about 5 wt. % to about 30 wt. %, or about 5 wt. % to about 15 wt. % based a total weight of the hydrocarbon adsorbent coating. In some embodiments, the hydrocarbon adsorbent coating further comprises activated carbon.

In some embodiments, the hydrocarbon adsorbent structure is in a form of a monolithic body, and wherein at least 50%, at least 60%, at least 70%, at least 80%, or at least 90% of the zeolite forms the monolithic body.

In another aspect of the present disclosure, a bleed emission scrubber (e.g., which may be adapted for use in an evaporative emission control canister system) comprises an adsorbent volume, at least one adsorbent volume comprising at least one hydrocarbon adsorbent structure as described herein.

In another aspect of the present disclosure, an air intake system (e.g., which may be adapted for reducing evaporative emissions in a vehicle) comprises at least one hydrocarbon adsorbent structure as described herein.

In another aspect of the present disclosure, a cabin air purification system (e.g., which may be adapted for reducing evaporative emissions in a vehicle) comprises at least one hydrocarbon adsorbent structure as described herein.

In another aspect of the present disclosure, an evaporative emission control canister comprises: one or more adsorbent volumes located within or external to the evaporative emission control canister; and at least one bleed emission scrubber contained within an adsorbent volume of the evaporative emission control canister and fluidly coupled thereto, wherein each bleed emission scrubber comprises at least one hydrocarbon adsorbent structure described herein. In some embodiments, the evaporative emission control canister comprises a plurality of bleed emission scrubbers each comprising at least one hydrocarbon adsorbent structure described herein. The one or more of the bleed emission scrubbers may be contained within a respective adsorbent volume of the evaporative emission control canister. In some embodiments, each of the plurality of bleed emission scrubbers is fluidly arranged in a series configuration, a parallel configuration, or a combination thereof with the other bleed emission scrubbers or other adsorbent volumes within the evaporative emission control canister. In some embodiments, one or more the bleed emission scrubbers are adapted for use in or incorporated into an evaporative emission control canister system having a canister volume of 3.5 L or less, 3.0 L or less, 2.5 L or less, or 2.0 L or less. In some embodiments, a volume of a bleed emission scrubber or a hydrocarbon adsorbent structure is less than 4 dL. In some embodiments, at least a portion of the micropores of the zeolite exhibit a pore volume of greater than 0.01 mL/g.

In another aspect of the present disclosure, an evaporative emission control system comprises: a fuel tank for fuel storage; an engine adapted to receive and consume fuel from the fuel tank; and an evaporative emission control canister system fluidly coupled to the engine, the evaporative emission control canister system comprising: at least one bleed emission scrubber fluidly coupled to an evaporative emission control, wherein the at least one bleed emission scrubber comprises an adsorbent volume, the adsorbent volume comprising at least one hydrocarbon adsorbent structure described herein. In some embodiments, the evaporative emission control system further comprises a plurality of bleed emission scrubbers, each of the plurality of bleed emission scrubbers being fluidly arranged in a series configuration, a parallel configuration, or a combination thereof with the other bleed emission scrubbers or other adsorbent volumes within the evaporative emission control canister system.

In another aspect of the present disclosure, an evaporative emission control system comprises a fuel tank for fuel storage; an engine adapted to receive and consume fuel from the fuel tank; and an evaporative emission control canister system fluidly coupled to the engine, the evaporative emission control canister system comprising: at least one bleed emission scrubber fluidly coupled to an evaporative emission control canister, wherein the bleed emission scrubber comprises an adsorbent volume, the adsorbent volume comprising at least one hydrocarbon adsorbent structure comprising a zeolite having a silica-to-alumina ratio of at least 20, wherein the repeatable TGA butane adsorption of the zeolite is greater than 2 wt. %.

In some embodiments, the evaporative emission control system further comprises a plurality of bleed emission scrubbers, each of the plurality of bleed emission scrubbers being fluidly arranged in a series configuration, a parallel configuration, or a combination thereof with the other bleed emission scrubbers or other adsorbent volumes within the evaporative emission control canister system.

In another aspect of the present disclosure, a zeolite comprises micropores that account for at least about 90% of a total pore volume of the zeolite. The micropores have pore widths of less than 20 Å, are hydrogen ($H^+$) or ammonium ($NH_4^+$) ion exchanged, and have a silica-to-alumina ratio of the zeolite is greater than about 100, greater than about 150, or greater than about 200. In some embodiments, the zeolite is in a form of zeolite particles characterized by an average d90 particle size from about 5 micrometers to about 50 micrometers. In some embodiments, the zeolite comprises a zeolite selected from a group consisting of: AEI, BEA, BEC, CHA, EMT, FAU, FER, MFI, and combinations thereof. In some embodiments, the zeolite comprises BEA zeolite. In some embodiments, the zeolite comprises MFI zeolite.

In another aspect of the present disclosure, a slurry comprising: a binder; and the zeolite as described herein.

In another aspect of the present disclosure, an adsorbent bed comprises adsorbent particles comprising the zeolite as described herein.

In another aspect of the present disclosure, a bleed emission scrubber adapted for use in or incorporated into an evaporative emission control canister system comprises an adsorbent volume. In some embodiments, the adsorbent volume comprises at least one hydrocarbon adsorbent structure comprising a zeolite having a silica-to-alumina ratio of at least 20, wherein the repeatable TGA butane adsorption of the zeolite is greater than 2 wt. %.

In some embodiments, the bleed emission scrubber is adapted for use in or incorporated into an evaporative emission control canister system having a canister volume of 3.5 L or less, 3.0 L or less, 2.5 L or less, or 2.0 L or less.

In some embodiments, the zeolite comprises micropores having pore widths of less than 20 Å, wherein at least a portion of the micropores exhibit a pore volume of greater than 0.01 mL/g. In some embodiments, the average pore width of the zeolite is between 2.0 and 6.7 Å.

In some embodiments, the hydrocarbon adsorbent structure comprises a hydrocarbon adsorbent coating formed on a substrate. In some embodiments, the substrate is a ceramic monolith.

As used herein, the terms "adsorbent" and "adsorbent material" refer to a material that can adhere gas molecules, ions, or other species within its structure. Specific materials include but are not limited to clays, metal organic framework, activated alumina, silica gel, activated carbon, molecular sieve carbon, zeolites (e.g., molecular sieve zeolites), polymers, resins, and any of these components or others having a gas-adsorbing material supported thereon (e.g., such as the various embodiments of sorbents described herein). Certain adsorbent materials may preferentially or selectively adhere particular species.

As used herein, the term "adsorption capacity" refers to a working capacity for an amount of a chemical species that an adsorbent material can adsorb under specific operating conditions (e.g., temperature and pressure). The units of adsorption capacity, when given in units of mg/g, correspond to milligrams of adsorbed gas per gram of sorbent.

Also as used herein, the term "particles" refers to a collection of discrete portions of a material each having a largest dimension ranging from 0.1 μm to 50 mm. The morphology of particles may be crystalline, semi-crystalline, or amorphous. The size ranges disclosed herein can be mean/average or median size, unless otherwise stated. It is noted also that particles need not be spherical, but may be in a form of cubes, cylinders, discs, or any other suitable shape as would be appreciated by one of ordinary skill in the art. "Powders" and "granules" may be types of particles.

Also as used herein, the term "substrate" refers to a material (e.g., ceramic, metallic, semi-metallic, semi-metal oxide, metal oxide, polymeric, paper-based, pulp/semi-pulp product-based, etc.) onto or into which an adsorbent material is formed, deposited, or placed (e.g., in the form of a washcoat).

Also as used herein, the term "washcoat" refers to a thin adherent coating of a material applied to a substrate. A washcoat may be formed by preparing a slurry containing a specified solids content (e.g., 10-50% by weight) of adsorbent particles, which is then coated onto a substrate and dried. In certain embodiments, the substrate may be porous and the washcoat may be deposited outside and/or inside the pores.

Also as used herein, the term "monolith" refers to a single unitary block of a particular material. The single unitary block can be in the form of, e.g., a brick, a disk, or a rod and can contain channels for increased gas flow/distribution. In certain embodiments, multiple monoliths can be arranged together to form a desired shape. In certain embodiments, a monolith may have a honeycomb structure with multiple parallel channels each having a square shape, a hexagonal shape, or another other shape. In certain embodiments, multiple monoliths with honeycomb structures can be stacked together. A monolith may be used as a substrate for which an adsorbent material is formed thereon.

Also as used herein, the term "dispersant" refers to a compound that helps to maintain solid particles in a state of suspension in a fluid medium and inhibits or reduces agglomeration or settling of the particles in the fluid medium.

Also as used herein, the term "binder" refers to a material that, when included in a coating, layer, or film, promotes the formation of a continuous or substantially continuous structure from one outer surface of the coating, layer, or film through to the opposite outer surface, is homogeneously or semi-homogeneously distributed in the coating, layer, or film, and promotes adhesion to a surface on which the coating, layer, or film is formed and cohesion between the surface and the coating, layer, or film.

Also as used herein, the terms "stream" or "flow" broadly refer to any flowing gas that may contain solids (e.g., particulates), liquids (e.g., vapor), and/or gaseous mixtures.

Surface area, as discussed herein, is determined by the Brunauer-Emmett-Teller (BET) method according to DIN ISO 9277:2003-05 (which is a revised version of DIN 66131), which is referred to as "BET surface area." The specific surface area is determined by a multipoint BET measurement in the relative pressure range from 0.05-0.3 $p/p_0$.

Also as used herein, the term "about," as used in connection with a measured quantity, refers to the normal variations in that measured quantity, as expected by the skilled artisan making the measurement and exercising a level of care commensurate with the objective of measurement and the precision of the measuring equipment. For example, when "about" modifies a value, it may be interpreted to mean that the value can vary by ±1%.

Unless otherwise defined, all technical terms used herein have the same meaning as commonly understood by one of ordinary skill in the art to which this disclosure belongs.

BRIEF DESCRIPTION OF THE DRAWINGS

The present disclosure is illustrated by way of example, and not by way of limitation, in the figures of the accompanying drawings, in which.

DETAILED DESCRIPTION

The embodiments described herein relate to hydrocarbon adsorbents and bleed emission scrubbers incorporating the same, which may be utilized in hydrocarbon emission control systems. Certain embodiments relate to the use of zeolite-based hydrocarbon adsorbents.

It has been found that canisters with hydrocarbon scrubbers that have a g-total butane working capacity (BWC) of less than 2 grams may still pass the CARB LEV III Bleed Emission Test Procedure (BETP test) in some circumstances. The g-total BWC of a scrubber is measured at a butane concentration of 50%, whereas the concentration of fuel vapors (e.g., butane) that the scrubber is exposed to during the BETP test is on the order of 0.5%. Thus, an adsorbent that has a relatively high butane adsorption capacity at 0.5% butane when compared to standard activated carbon adsorbent materials used in evaporative emission control applications can be used to meet this regulation. This can be ascertained by measuring the butane isotherm of the adsorbent material, which quantifies the butane adsorption capacity of the material as a function of the butane partial pressure.

Certain embodiments of the present disclosure relate to adsorbent materials that improve BETP test performance. Such materials include mesopores and micropores but differ from standard materials in that a significant amount of small micropores are present, which are of a size (e.g., width less than 20 Å) that will adsorb butane at low concentrations. Such a material would thus have a high butane adsorption capacity at concentrations that the scrubber will be exposed to during the BETP test. The measured butane isotherm curve of this material would steeply rise up to a butane partial pressure of <0.5% and then level off and become completely flat thereafter. Zeolite materials that have micropores intrinsically present in their crystal structures are one possible example category of such materials. Furthermore, the pores of zeolites could be chemically modified (e.g., with silane or alkyl groups) to increase their hydrophobicity, which would increase their preferential adsorption for the aliphatic hydrocarbons found in fuel vapors while in the presence of more polar species such as water.

Bleed Emission Scrubber Embodiments

Figure 1A:
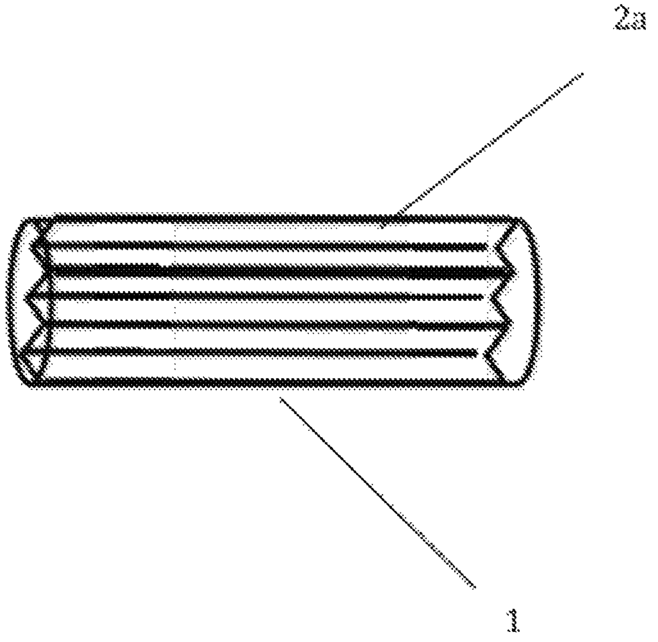
FIG. 1A is a cross-sectional view of a bleed emission scrubber provided according to a first embodiment.
Figure 1B:
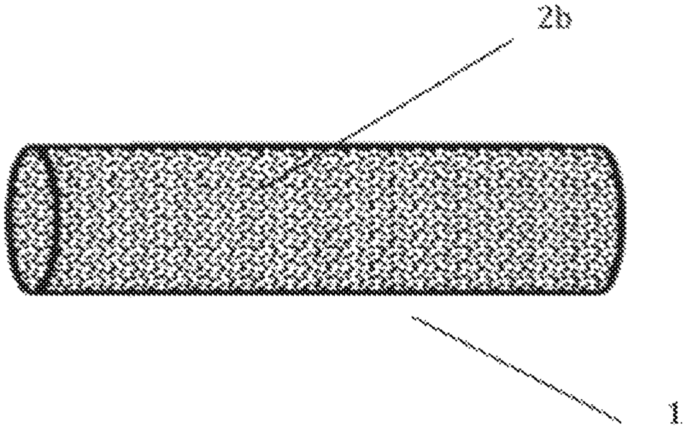
FIG. 1B is a cross-sectional view of a bleed emission scrubber provided according to a second embodiment.

Certain embodiments of the present disclosure relate to bleed emission scrubbers that are adapted for use in evaporative emission control canister systems. A bleed emission scrubber (also referred to herein as a “scrubber”), in accordance with certain embodiments, may comprise an adsorbent volume comprising a hydrocarbon adsorbent structure, such as a coated substrate as described herein. FIG. 1A illustrates an embodiment of bleed emission scrubber 1, wherein the coated substrate 2*a* is a structured media of pleated form having a hydrocarbon adsorbent coating formed thereon. In some embodiments, the coated substrate 2*a* is a coated monolith. FIG. 1B illustrates an embodiment wherein the coated substrate 2*b* is a foam having a hydrocarbon adsorbent coating formed thereon. In one embodiment, the foam has greater than about 10 pores per inch. In some embodiments, the foam 2*b* has greater than about 20 pores per inch. In some embodiments, the foam has between about 15 and about 40 pores per inch. In one embodiment, the foam is comprised of polyurethane. In some embodiments, the foam comprises reticulated polyurethane. In some embodiments, the polyurethane is a polyether or polyester polyurethane. In some embodiments, the coated substrate may comprise a substrate having multiple stacked coatings formed thereon. For example, in some embodiments, the coatings may be of the same type of adsorbent material, different absorbent materials, or alternating absorbent materials. In some embodiments, the substrate may at least partially be formed from the same hydrocarbon adsorbent that is contained in the coating (e.g., a partially zeolitic substrate or a completely zeolitic substrate having one or more zeolite coatings formed thereon).

Figure 1C:
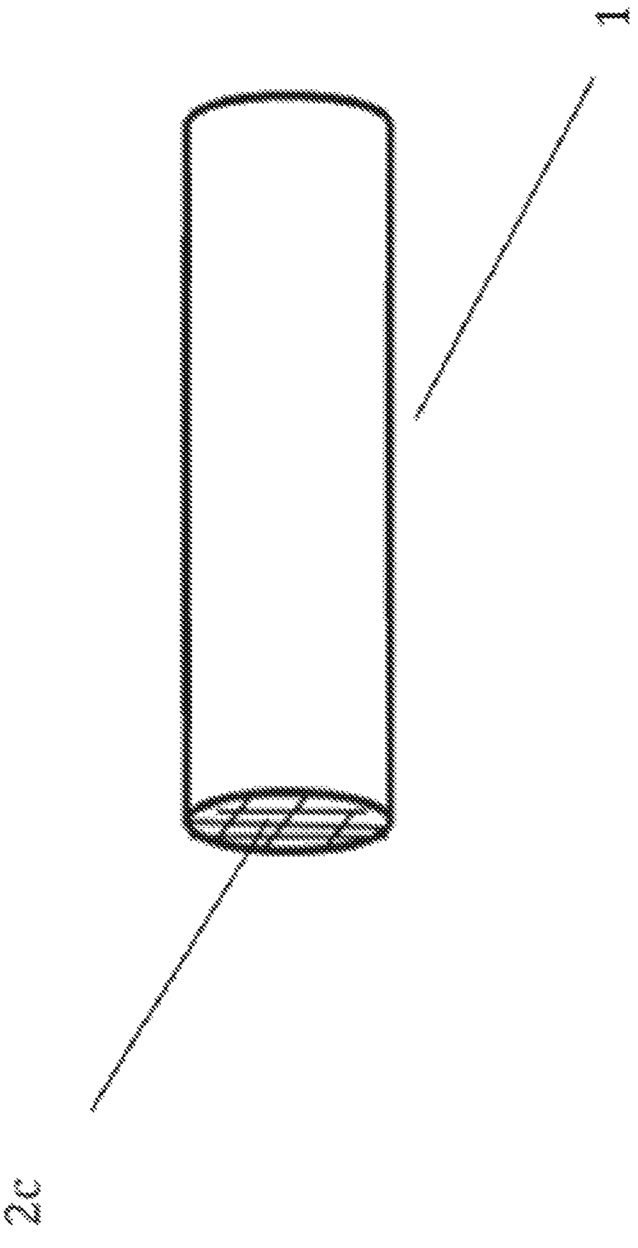
FIG. 1C is a cross-sectional view of a bleed emission scrubber provided according to a third embodiment.

FIG. 1C illustrates an embodiment wherein the coated substrate 2*c* is an extruded media having a hydrocarbon adsorbent coating formed thereon. In some embodiments, the extruded media is a honeycomb (e.g., a monolithic honeycomb structure). The overall shape of the honeycomb may be of any suitable geometry including, but not limited to, round, cylindrical, or square. Furthermore, the cells of honeycomb adsorbents may be of any geometry. Honeycombs of uniform cross-sectional areas for the flow-through passages, such as square honeycombs with square cross-sectional cells or spiral wound honeycombs of corrugated form, may perform better than round honeycombs with square cross-sectional cells in a right angled matrix that provides adjacent passages with a range of cross-sectional areas and therefore passages that are not equivalently purged. Without being bound by any theory, it is believed that the more uniform cell cross-sectional areas across the honeycomb faces, the more uniform flow distribution within the scrubber during both adsorption and purge cycles, and, therefore, lower diurnal breathing loss (DBL) emissions from the scrubber.

Surprisingly, it has been found that the bleed emission scrubbers incorporating the coating monoliths as disclosed herein, can, in some embodiments, have a butane working capacity (BWC) lower than that of competitive monoliths, yet still effectively control the hydrocarbon emissions from an evaporative emission control canister under low purge conditions.

In some embodiments, the bleed emission scrubber has a g-total butane working capacity (BWC) of less than 2 grams. In some embodiments, the bleed emission scrubber has a g-total BWC of from about 0.1 grams to 1.999 grams. In some embodiments, the bleed emission scrubber has a g-total BWC of from about 0.3 grams to 1.999 grams. In some embodiments, the bleed emission scrubber has a g-total BWC of from about 0.2 grams to 1.999 grams. In some embodiments, the bleed emission scrubber has a g-total BWC of from about 0.4 grams to 1.999 grams. In some embodiments, the bleed emission scrubber has a g-total BWC of from about 0.5 grams to 1.999 grams. In some embodiments, the bleed emission scrubber has a g-total BWC of from about 0.75 grams to 1.999 grams. In some embodiments, the bleed emission scrubber has a g-total BWC of from about 1.0 grams to 1.999 grams. In some embodiments, the bleed emission scrubber has a g-total BWC of from about 1.25 grams to 1.999 grams. In some embodiments, the bleed emission scrubber has a g-total BWC of from about 1.5 grams to 1.999 grams. In some embodiments, the bleed emission scrubber has a g-total BWC of from about 1.75 grams to 1.999 grams. In some embodiments, the bleed emission scrubber has a g-total BWC of from about 1.9 grams to 1.999 grams. In some embodiments, the bleed emission scrubber has a g-total BWC of from about 1.95 grams to 1.999 grams. In some embodiments, the bleed emission scrubber has a g-total BWC of from about 0.1 grams to about 1.9 grams. In some embodiments, the bleed emission scrubber has a g-total BWC of from about 0.1 grams to about 1.75 grams. In some embodiments, the bleed emission scrubber has a g-total BWC of from about 0.1 grams to about 1.5 grams. In some embodiments, the bleed emission scrubber has a g-total BWC of from about 0.1 grams to about 1.25 grams. In some embodiments, the bleed emission scrubber has a g-total BWC of from about 0.1 grams to about 1.0 grams. In some embodiments, the bleed emission scrubber has a g-total BWC of from about 0.1 grams to about 0.75 grams. In some embodiments, the bleed emission scrubber has a g-total BWC of from about 0.1 grams to about 0.5 grams. In some embodiments, the bleed emission scrubber has a g-total BWC of from about 0.1 grams to about 0.3 grams. In some embodiments, the bleed emission scrubber has a g-total BWC of from about 0.75 grams to about 1.5 grams. In some embodiments, the bleed emission scrubber has a g-total BWC of from about 0.75 grams to about 1.25 grams. In some embodiments, the bleed emission scrubber has a g-total BWC of from about 0.75 grams to about 1.0 grams. As used herein, "g-total BWC" refers to the total mass of butane adsorbed under standard test conditions (e.g., ASTM D5228).

In some embodiments, the bleed emission scrubber has an effective butane working capacity (BWC) of less than 3 g/dL. In some embodiments, the bleed emission scrubber has an effective BWC of from about 0.1 g/dL to less than 3 g/dL. In some embodiments, the bleed emission scrubber has an effective BWC of from about 0.25 g/dL to less than 3 g/dL. In some embodiments, the bleed emission scrubber has an effective BWC of from about 0.5 g/dL to less than 3 g/dL. In some embodiments, the bleed emission scrubber has an effective BWC of from about 0.75 g/dL to less than 3 g/dL. In some embodiments, the bleed emission scrubber has an effective BWC of from about 1 g/dL to less than 3 g/dL. In some embodiments, the bleed emission scrubber has an effective BWC of from about 1.25 g/dL to less than 3 g/dL. In some embodiments, the bleed emission scrubber has an effective BWC of from about 1.5 g/dL to less than 3 g/dL. In some embodiments, the bleed emission scrubber has an effective BWC of from about 1.75 g/dL to less than 3 g/dL. In some embodiments, the bleed emission scrubber has an effective BWC of from about 1.5 g/dL to less than 3 g/dL. In some embodiments, the bleed emission scrubber has an effective BWC of from about 1.75 g/dL to less than 3 g/dL. In some embodiments, the bleed emission scrubber has an effective BWC of from about 2 g/dL to less than 3 g/dL. In some embodiments, the bleed emission scrubber has an effective BWC of from about 2.25 g/dL to less than 3 g/dL. In some embodiments, the bleed emission scrubber has an effective BWC of from about 2.5 g/dL to less than 3 g/dL. In some embodiments, the bleed emission scrubber has an effective BWC of from about 2.75 g/dL to less than 3 g/dL. In some embodiments, the bleed emission scrubber has an effective BWC of from about 1.0 g/dL to about 2.5 g/dL. In some embodiments, the bleed emission scrubber has an effective BWC of from about 1.0 g/dL to about 2.25 g/dL. In some embodiments, the bleed emission scrubber has an effective BWC of from about 1.5 g/dL to about 2 g/dL. In some embodiments, the bleed emission scrubber has an effective BWC of from about 1.5 g/dL to about 1.75 g/dL. In some embodiments, the bleed emission scrubber has an effective BWC of from about 1.25 g/dL to less than 3 g/dL. In some embodiments, the bleed emission scrubber has an effective BWC of from about 1.25 g/dL to about 2.5 g/dL. In some embodiments, the bleed emission scrubber has an effective BWC of from about 1.25 g/dL to about 2.25 g/dL. In some embodiments, the bleed emission scrubber has an effective BWC of from about 1.5 g/dL to about 2.5 g/dL. In some embodiments, the bleed emission scrubber has an effective BWC of from about 1.5 g/dL to about 2.25 g/dL. In some embodiments, the bleed emission scrubber has an effective BWC of from about 1.75 g/dL to about 2.5 g/dL. In some embodiments, the bleed emission scrubber has an effective BWC of from about 1.75 g/dL to about 2.25 g/dL. In some embodiments, the bleed emission scrubber has an effective BWC of from about 2 g/dL to about 2.5 g/dL. In some embodiments, the bleed emission scrubber has an effective BWC of from about 2 g/dL to about 2.25 g/dL.

As used herein, "effective butane working capacity" refers to g-total BWC divided by the effective adsorbent volume. Effective adsorbent volume corrects for voids, air gaps, and other non-adsorptive volumes.

Canister Embodiments

In certain embodiments, the coated substrates and/or scrubbers disclosed herein may be used as components in evaporative emission control canisters. In one embodiment, an evaporative emission control canister comprises an adsorbent volume, a fuel vapor purge tube for connecting the evaporative emission control canister to an engine, a fuel vapor inlet conduit for venting a fuel tank to the evaporative emission control canister, and a vent conduit for venting the evaporative emission control canister to the atmosphere and for admission of purge air to the evaporative emission control canister; and a bleed emission scrubber as described herein. The bleed emission scrubber may be in fluid communication with the evaporative emission control canister. In some embodiments, the evaporative emission control canister may be used as a component in an evaporative emission control system. Further non-limiting embodiments of evaporative emission control canisters and scrubbers are therefore described herein in reference to such evaporative emission control systems.

In certain embodiments, a canister may comprise multiple adsorbent volumes, each of which may contain different adsorbents or devices having adsorbents contained therein. Some of more of the adsorbent volumes may be fluidly coupled to each other such that one or more adsorbent materials contained therein are fluidly coupled in parallel, in series, or a combination of both.

Evaporative Emission Control System Embodiments

In certain embodiments, an evaporative emission control system comprises a fuel tank for fuel storage; an engine (e.g., an internal combustion engine or a hybrid engine) adapted to consume the fuel; an evaporative emission control canister comprising an adsorbent volume, a fuel vapor purge tube connecting the evaporative emission control canister to the engine, a fuel vapor inlet conduit for venting the fuel tank to the evaporative emission control canister, and a vent conduit for venting the evaporative emission control canister to the atmosphere and for admission of purge air to the evaporative emission control canister system; and a bleed emission scrubber as described herein. The bleed emission scrubber may be in fluid communication with the evaporative emission control canister.

In some embodiments, the evaporative emission control system may be configured to permit sequential contact of the adsorbent volumes by the fuel vapor. In some embodiments, the evaporative emission control system may define a fuel vapor flow path from the fuel vapor inlet conduit to the evaporative emission control canister, toward the bleed emission scrubber and to the vent conduit, and by a reciprocal air flow path from the vent conduit to the bleed emission scrubber, toward the evaporative emission control canister, and toward the fuel vapor purge tube.

In some embodiments, evaporative emissions from the fuel tank are adsorbed by the evaporative emission control system during engine off times. The fuel vapor that bleeds from the fuel tank may be removed by the adsorbents in the canister system so that the amount of fuel vapor released into the atmosphere is reduced. At the time of operating the engine, atmospheric air is introduced into the canister system and bleed emission scrubber as a purge stream. Hydrocarbons, which were previously adsorbed by the hydrocarbon adsorbent, may then be desorbed and recirculated to the engine for combustion through a purge line.

In some embodiments, the evaporative emission control canister of the evaporative emission control system comprises a three-dimensional hollow interior space or chamber defined at least in part by a shaped planar material, such as molded thermoplastic olefin. In some embodiments, the bleed emission scrubber is located within an adsorbent volume of the evaporative emission control canister. In other embodiments, the bleed emission scrubber is located in a separate canister that is in fluid communication with the evaporative emission control canister. In some embodiments, the evaporative emission control system according to the embodiment wherein the bleed emission scrubber is located in a separate canister is illustrated in FIG. 2.

Figure 2:
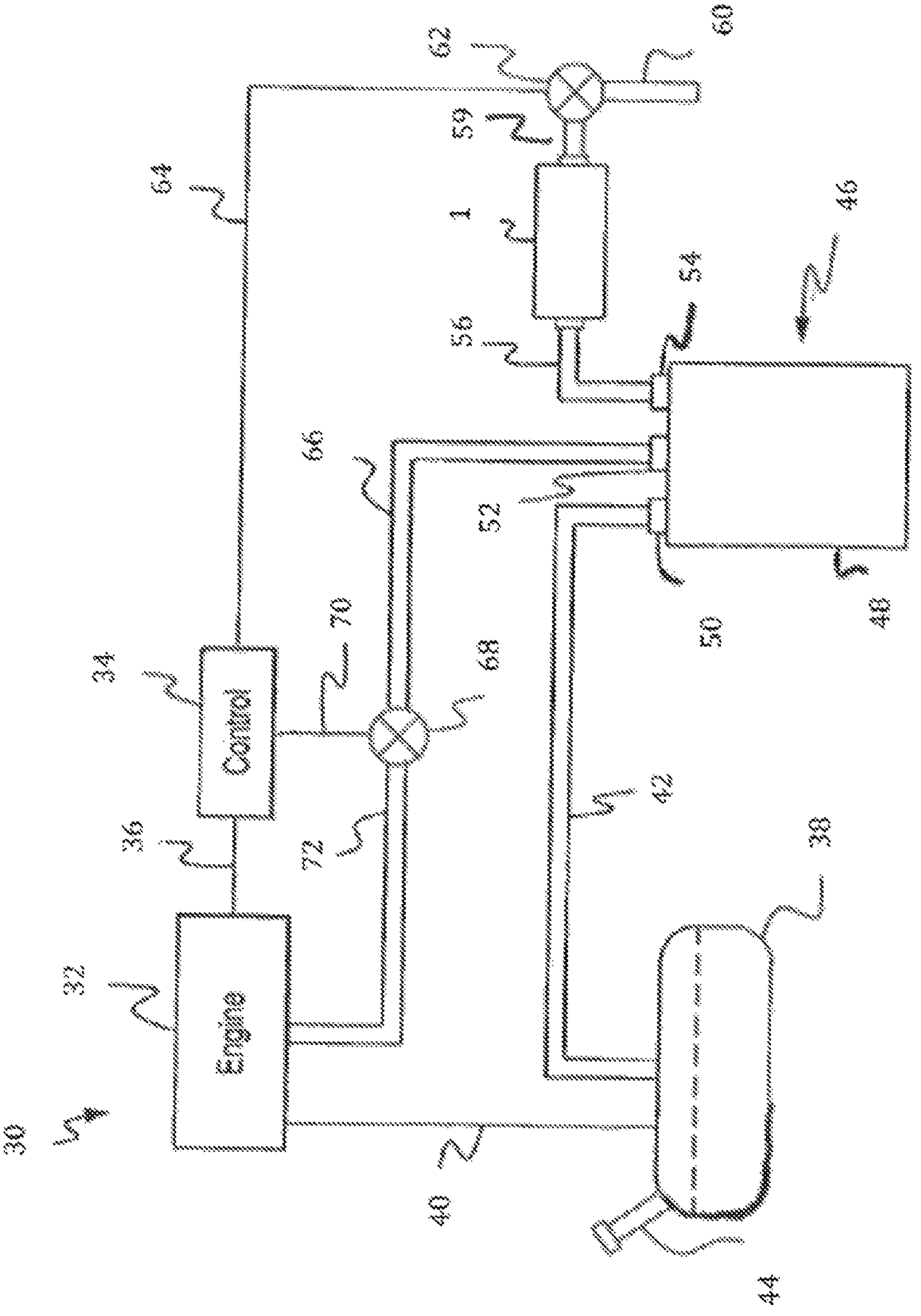
FIG. 2 is a schematic representation of an evaporative emission control system comprising an evaporative emission control canister and a bleed emission scrubber provided in accordance with one embodiment.

FIG. 2 schematically illustrates an evaporative emission control system 30 in accordance with certain embodiments of the present disclosure. The evaporative emission control system 30 comprises a fuel tank 38 for fuel storage (having a fuel inlet 44), an engine 32 (which may be an internal combustion engine or a hybrid engine) adapted to consume the fuel and coupled to the fuel tank 38 via a fuel line 40, an evaporative emission control canister 46, and a bleed emission scrubber 1. The engine 32 may be, for example, an engine that is controlled by a controller 34 via a signal lead 36. In some embodiments, the engine 32 burns gasoline, ethanol, and/or other volatile hydrocarbon-based fuels. The controller 34 may be a separate controller or may form part of an engine control module (ECM), a powertrain control module (PCM), or any other vehicle controller.

In some embodiments, the evaporative emission control canister 46 comprises an adsorbent volume 48, a fuel vapor purge tube 66 connecting the evaporative emission control canister 46 to the engine 32, a fuel vapor inlet conduit 42 for venting the fuel tank 38 to the evaporative emission control canister 46, and vent conduits 56, 59, 60 for venting the evaporative emission control canister 46 to the atmosphere and for admission of purge air to the evaporative emission control system 30.

The evaporative emission control system 30 is further defined by a fuel vapor flow path from the fuel vapor inlet conduit 42 to the adsorbent volume 48, through vent conduit 56 toward the bleed emission scrubber 1, and to the vent conduits 59, 60; and by a reciprocal air flow path from the vent conduits 60, 59 to the bleed emission scrubber 58, through vent conduit 56 toward the adsorbent volume 48, and toward the fuel vapor purge tube 66. The bleed emission scrubber 1 comprises one or more adsorbent volumes, with some or all including any of the coated substrates adapted for hydrocarbon adsorption described herein.

Fuel vapor, containing hydrocarbons which have evaporated from the fuel tank 38, can pass from the fuel tank 38 to the adsorbent volume 48 within canister 46 through evaporative vapor inlet conduit 42. In some embodiments, adsorbent volumes in addition to adsorbent volume 48 may be present, and may be connect in series or in parallel with the adsorbent volume 48. The evaporative emission control canister 46 may be formed from any suitable material. For example, molded thermoplastic polymers such as nylon are typically used.

Fuel vapor pressure increases as the temperature of the gasoline in fuel tank 38 increases. Without the evaporative emission control system 30, the fuel vapor would be released to the atmosphere untreated. However, in accordance with the present disclosure, fuel vapors are treated by evaporative emission control canister 46 and by the bleed emission scrubber 1 (or additional bleed emission scrubbers in some embodiments), located downstream of the evaporative emission control canister 46.

When the vent valve 62 is open, and purge valve 68 closed, fuel vapors flow under pressure from the fuel tank 38 through the evaporative vapor inlet conduit 42, the canister vapor inlet 50 and sequentially through the adsorbent volume 48 contained within the evaporative emission control canister 46. Subsequently, any fuel vapors not adsorbed by the adsorbent volume 48 flow out of the evaporative emission control canister 46 via vent conduit opening 54 and vent conduit 56. The fuel vapors then enter the bleed emission scrubber 1 for further adsorption. After passage through the bleed emission scrubber 1, any remaining fuel vapors exit the bleed emission scrubber 1 via conduit 59, vent valve 62, and the vent conduit 60.

Gradually, the hydrocarbon adsorbent material contained in both the evaporative emission control canister 46 and the adsorbent volume of bleed emission scrubber 1 become laden with hydrocarbons adsorbed from the fuel vapor. When the hydrocarbon adsorbent material becomes saturated with hydrocarbons, the hydrocarbons must be desorbed in order for there to be continued use of the hydrocarbon adsorbent for controlling emitted fuel vapors from the fuel tank 38. During engine operation, the engine controller 34 commands valves 62 and 68, via signal leads 64 and 70, respectively, to open and create an air flow pathway between the atmosphere and the engine 32. The opening of the purge valve 68 allows clean air to be drawn into bleed emission scrubber 1 and subsequently into the evaporative emission control canister 46 via the vent conduits 60, 59, and 56 from the atmosphere. The clean air, or purge air, flows in through the clean air vent conduit 60, through the bleed emission scrubber 1, through the vent conduit 56, through the vent conduit opening 54, and into the evaporative emission control canister 46. The clean air flows past and/or through the hydrocarbon adsorbents contained within bleed emission scrubber 1 and the emission control canister 46, desorbing hydrocarbons from the saturated hydrocarbon adsorbents within each volume. A stream of purge air and hydrocarbons then exits evaporative emission control canister 46 through the purge opening outlet 52, the purge line 66, and the purge valve 68. The purge air and hydrocarbons flow through the purge line 72 to the engine 32, where the hydrocarbons are subsequently combusted.

FIG. 2 illustrates the bleed emission scrubber 1 as being located external to the evaporative emission control canister 46. In other embodiments, the bleed emission scrubber 1 may be disposed within the evaporative emission control canister 46, e.g., within the adsorbent volume 48. In other embodiments, the evaporative emission control system 30 may include multiple bleed emission scrubbers, which may be contained within one or more adsorbent volumes of the evaporative emission control canister 46, outside but in fluid communication with the evaporative emission control canister 46, or a combination of both.

In some embodiments, the adsorbent volume of the bleed emission scrubber 1 (and any additional adsorbent volumes) may include a volumetric diluent. Non-limiting examples of the volumetric diluents may include, but are not limited to, spacers, inert gaps, foams, fibers, springs, channels within a monolith, a structural non-adsorbent material of a monolith, or combinations thereof. Additionally, the evaporative emission control canister 46 may include an empty volume anywhere within the system. As used herein, the term "empty volume" refers to a volume not including any adsorbent. Such volume may comprise any non-adsorbent including, but not limited to, air gap, foam spacer, screen, or combinations thereof.

Figure 3:
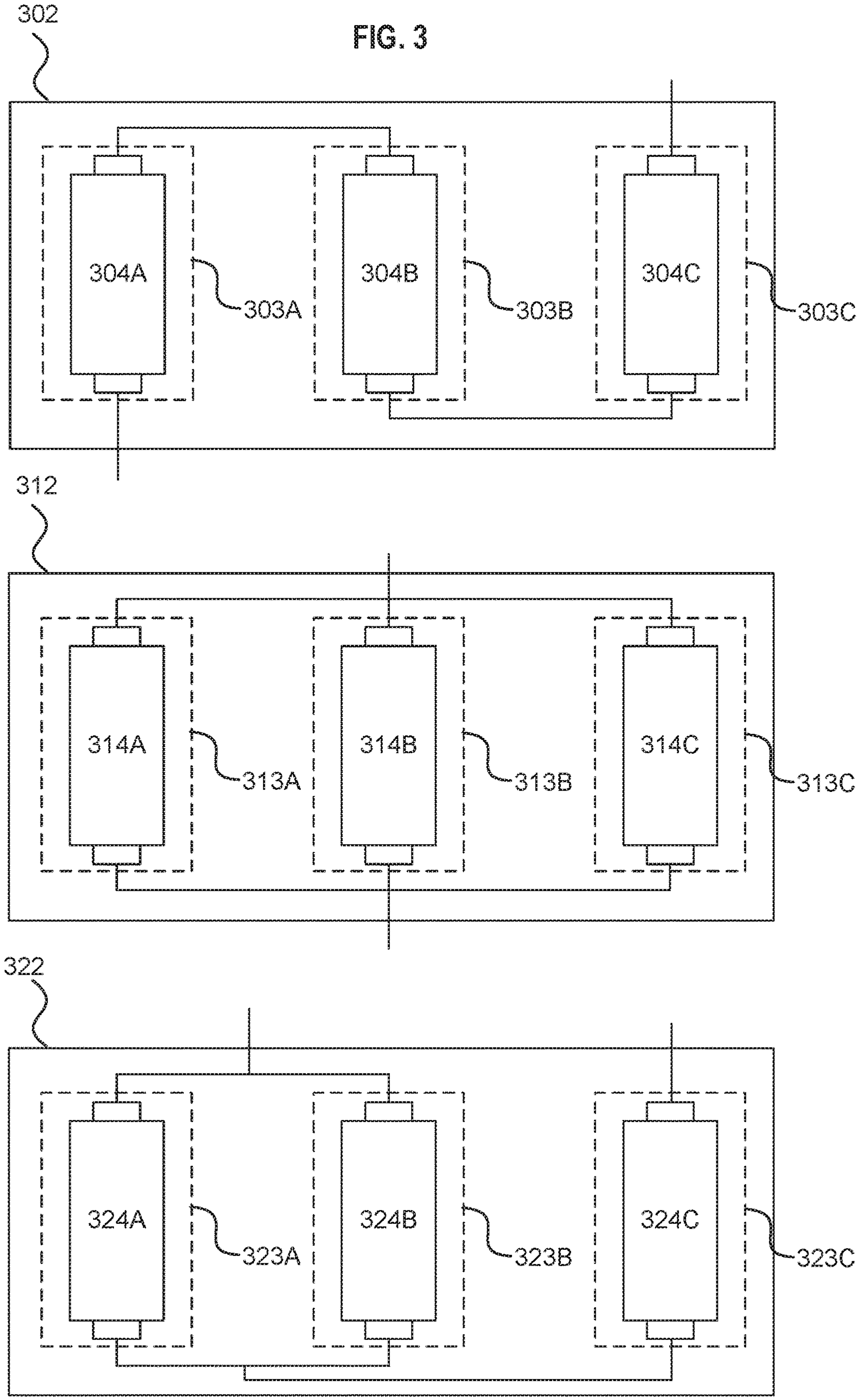
FIG. 3 illustrates fluid coupling arrangements for bleed emission scrubbers, according to certain embodiments.

FIG. 3 illustrates fluid coupling arrangements for bleed emission scrubbers, according to certain embodiments. Each of evaporative emission control canisters 302, 312, and 322 include multiple adsorbent volumes, 304, 314, and 324, respectively. Bleed emission scrubbers 304, 314, and 324 are disposed within the adsorbent volumes 304, 314, and 324, respectively. Bleed emission scrubbers 304 are fluidly coupled in a series arrangement. Bleed emission scrubbers 314 are fluidly coupled in a parallel arrangement. Bleed emission scrubbers 324 are fluidly coupled in a combination of series and parallel, with the parallel coupling of bleed emission scrubbers 324A and 324B being in series with bleed emission scrubber 324C.

In some embodiments, one or more of the bleed emission scrubbers may be located externally to its respective evaporative emission control canister but be fluidly coupled to one or more of the bleed emission scrubbers disposed therein or another device or adsorbent volume disposed therein. In some embodiments, one or more bleed emission scrubbers may be disposed within a single adsorbent volume (e.g., in series with each other).

Substrates

In certain embodiments, a hydrocarbon adsorbent is disposed on a substrate. Articles comprising the coated substrates, such as a bleed emission scrubber may, in some embodiments, be part of an evaporative emission control systems. In general, substrates are three-dimensional, having a length and a diameter and a volume, similar to a cylinder. The shape does not necessarily have to conform to a cylinder. The length is an axial length defined by an inlet end and an outlet end. The diameter is the largest cross-section length, for example the largest cross-section if the shape does not conform exactly to a cylinder. In one or more embodiments, the substrate is a monolith, described herein below.

In some embodiments, the monolith may be of a type having fine, parallel gas flow passages extending there through from an inlet or an outlet face of the substrate such that passages are open to fluid flow therethrough. The passages, which may be essentially straight paths or may be patterned paths (e.g., zig-zag, herringbone, etc.) from their fluid inlet to their fluid outlet, are defined by walls on which the adsorbent material is coated as a washcoat, so that the gases flowing through the passages contact the adsorbent material. The flow passages of the monolith may be thin-walled channels, which can be of any suitable cross-sectional shape and size, such as trapezoidal, rectangular, square, triangular, sinusoidal, hexagonal, oval, circular, etc. Such structures may contain from about 60 to about 900 or more gas inlet openings per square inch of cross section (i.e., cells per square inch). Monolithic substrates may be comprised of, for example, metal, ceramic, plastic, paper, impregnated paper, and the like. In some embodiments, the substrate is a ceramic monolith.

In some embodiments, the substrate is selected from the group consisting of foams, monolithic materials, non-wovens, wovens, sheets, papers, twisted spirals, ribbons, structured media of extruded form, structured media of wound form, structured media of folded form, structured media of pleated form, structured media of corrugated form, structured media of poured form, structured media of bonded form, and combinations thereof.

In one embodiment, the substrate is an extruded media. In some embodiments, the extruded media is a honeycomb. The honeycomb may be in any geometrical shape including, but not limited to, round, cylindrical, or square. Furthermore, the cells of honeycomb substrates may be of any geometry.

In one embodiment, the substrate is a foam. In some embodiments, the foam has greater than about 10 pores per inch. In some embodiments, the foam has greater than about 20 pores per inch. In some embodiments, the foam has between about 15 and about 40 pores per inch. In some embodiments, the foam is a polyurethane. In some embodiments, the foam is a reticulated polyurethane. In some embodiments, the polyurethane is a polyether or polyester. In some embodiments, the substrate is a nonwoven.

In some embodiments, the substrate is a plastic. In some embodiments, the substrate is a thermoplastic polyolefin. In some embodiments, the substrate is a thermoplastic polyolefin containing a glass or mineral filler. In some embodiments, the substrate is a plastic selected from the group consisting of polypropylene, nylon-6, nylon-6,6, aromatic nylon, polysulfone, polyether sulfone, polybutylene terephthalate, polyphthalamide, polyoxymethylene, polycarbonate, polyvinylchloride, polyester, and polyurethane.

Hydrocarbon Adsorbent Coatings

In certain embodiments, the hydrocarbon adsorbent comprises a material capable of reversibly adsorbing hydrocarbons. Such materials may include, for example, activated carbon, zeolites, metal organic frameworks, metal oxide, and combinations thereof.

In some embodiments, the hydrocarbon adsorbent comprises a zeolite. In some embodiments, the zeolite can be an aluminosilicate material or a silica-aluminophosphate material. Zeolites can be identified by 3-letter codes designated by the International Zeolite Association. In some embodiments the zeolite may include, for example, AEI, AFT, AFX, BEA, BEC, CHA, DDR, EMT, ERI, EUO, FAU, FER, GME, HEU, KFI, LEV, LTA, LTL, MAZ, MEL, MFI, MFS, MOR, MTN, MTT, MTW, MWW, NES, OFF, PAU, RHO, SFW, TON, UFI, or combinations thereof. In some embodiments the zeolites may include, for example, zeolite X, zeolite Y, ultrastable zeolite Y, ZSM-5 zeolite, offretite, beta zeolite, ferrierite, faujasite, chabazite, mordentite, clinoptilolite, silicalite, or combinations thereof. In some embodiments, the zeolite is a beta zeolite with a high silica-to-alumina ratio.

In certain embodiments, the hydrocarbon adsorbent comprises a combination of adsorbent materials, such as, for example zeolite particles mixed with activated carbon particles. The activated carbon may be synthetic activated carbon or based on or derived from wood, peat coal, coconut shell, lignite, petroleum pitch, petroleum coke, coal tar pitch, fruit pits, nuts, shells, sawdust, wood flour, synthetic polymer, natural polymer, and combinations thereof.

In certain embodiments, the zeolite comprises micropores and mesopores. The micropores correspond to pores having widths of less than 20 Å. In some embodiments, the pores have widths from 2.0 Å to 6.7 Å, or from 4.0 Å to 6.5 Å. In some embodiments, the micropores account for at 70%, 80%, 90%, or greater of the total pore volume of the zeolite.

In some embodiments, a silica-to-alumina ratio of the zeolite is greater than about 100, greater than about 150, greater than about 200, or greater than about 250.

In some embodiments, the zeolite is in a form of zeolite particles. The zeolite particles may be characterized by an average d90 particle size from about 5 micrometers to about 50 micrometers, from about 10 micrometers to about 25 micrometers, or from about 15 micrometers to about 20 micrometers.

In certain embodiments, a BET surface area of the adsorbent is from about 20 $m^2/g$ to about 5,000 $m^2/g$, or greater. In certain embodiments, the BET surface area of the adsorbent is from about 20 $m^2/g$ to about 4,000 $m^2/g$, about 20 $m^2/g$ to about 3,000 $m^2/g$, about 20 $m^2/g$ to about 2,500 $m^2/g$, about 20 $m^2/g$ to about 2,000 $m^2/g$, about 20 $m^2/g$ to about 1,000 $m^2/g$, about 20 $m^2/g$ to about 500 $m^2/g$, about 20 $m^2/g$ to about 300 $m^2/g$, about 100 $m^2/g$ to about 5,000 $m^2/g$, about 100 $m^2/g$ to about 4,000 $m^2/g$, about 100 $m^2/g$ to about 3,000 $m^2/g$, about 100 $m^2/g$ to about 2,500 $m^2/g$, about 100 $m^2/g$ to about 2,000 $m^2/g$, about 100 $m^2/g$ to about 1,000 $m^2/g$, about 100 $m^2/g$ to about 500 $m^2/g$, about 100 $m^2/g$ to about 300 $m^2/g$, about 300 $m^2/g$ to about 5,000 $m^2/g$, about 300 $m^2/g$ to about 4,000 $m^2/g$, about 300 $m^2/g$ to about 3,000 $m^2/g$, about 300 $m^2/g$ to about 2,500 $m^2/g$, about 300 $m^2/g$ to about 2,000 $m^2/g$, about 300 $m^2/g$ to about 1,000 $m^2/g$, about 300 $m^2/g$ to about 500 $m^2/g$, about 750 $m^2/g$ to about 5,000 $m^2/g$, about 750 $m^2/g$ to about 4,000 $m^2/g$, about 750 $m^2/g$ to about 3,000 $m^2/g$, about 750 $m^2/g$ to about 2,500 $m^2/g$, about 750 $m^2/g$ to about 2,000 $m^2/g$, about 750 $m^2/g$ to about 1,000 $m^2/g$, about 1,200 $m^2/g$ to about 5,000 $m^2/g$, about 1,200 $m^2/g$ to about 4,000 $m^2/g$, about 1,200 $m^2/g$ to about 3,000 $m^2/g$, about 1,200 $m^2/g$ to about 2,500 $m^2/g$, about 1,500 $m^2/g$ to about 5,000 $m^2/g$, about 1,750 $m^2/g$ to about 5,000 $m^2/g$, about 2,000 $m^2/g$ to about 5,000 $m^2/g$, about 2,500 $m^2/g$ to about 5,000 $m^2/g$, about 3,000 $m^2/g$ to about 5,000 $m^2/g$, about 3,500 $m^2/g$ to about 5,000 $m^2/g$, or about 4,000 $m^2/g$ to about 5,000 $m^2/g$.

In some embodiments, the hydrocarbon adsorbent is prepared as a slurry that is washcoated onto the substrate. In some embodiments, a loading of the hydrocarbon adsorbent on the substrate is less than 1 $g/in^3$. In some embodiments, the loading is from 0.5 $g/in^3$ to 1 $g/in^3$, or from 0.75 $g/in^3$ to 1 $g/in^3$. In some embodiments, the loading is greater than 1 $g/in^3$. In some embodiments, the loading is from 1 $g/in^3$ to 1.25 $g/in^3$, from 1.25 $g/in^3$ to 1.5 $g/in^3$, from 1.5 $g/in^3$ to 1.75 $g/in^3$, or from 1.75 $g/in^3$ to 2 $g/in^3$.

In some embodiments, a coating thickness of the hydrocarbon adsorbent is greater than 50 micrometers and less than about 500 micrometers, less than 400 micrometers, less than 300 micrometers, less than 200 micrometers, or less than 100 micrometers.

In some embodiments, the coated substrate has dimensions compatible for use in a vapor canister having a volume of 2.0 L or less (e.g., a 1.9 L vapor canister). In some embodiments, the coated substrate has dimensions compatible for use in a canister having a volume of greater than 2.0 L (e.g., a 3.5 L vapor canister).

Binders

In some embodiments, the hydrocarbon adsorbent may further comprise a binder, which may help promote adhesion of the hydrocarbon adsorbent to the substrate. In some embodiments, the binder can crosslink with itself to provide improved adhesion. The presence of the binder may enhance the integrity of hydrocarbon adsorbent, improve its adhesion to the substrate, and provide structural stability under vibrational conditions encountered in motor vehicles.

The binder may comprise additives to improve water resistance and improve adhesion. Binders typical for use in the formulation of slurries include, but are not limited to, the following: organic polymers; sols of alumina, silica or zirconia; inorganic salts, organic salts, and/or hydrolysis products of aluminum, silica, or zirconium; hydroxides of aluminum, silica, or zirconium; organic silicates that are hydrolyzable to silica; and mixtures thereof. In some embodiments, the binder comprises a zirconium salt (e.g., zirconium acetate). In some embodiments, the binder is an organic polymer. The organic polymer may be a thermosetting or thermoplastic polymer and may be plastic or elastomeric. The binder may be, for example, an acrylic/styrene copolymer latex, a styrene-butadiene copolymer latex, a polyurethane, or any mixture thereof. The polymeric binder may contain suitable stabilizers and age resistors known in the art. In some embodiments, the binder is a thermosetting, elastomeric polymer introduced as a latex into the slurry (e.g., an aqueous slurry).

Examples of suitable binders include, but are not limited to, polyethylene, polypropylene, polyolefin copolymers, polyisoprene, polybutadiene, polybutadiene copolymers, chlorinated rubber, nitrile rubber, polychloroprene, ethylene-propylene-diene elastomers, polystyrene, polyacrylate, polymethacrylate, polyacrylonitrile, poly(vinyl esters), poly (vinyl halides), polyamides, cellulosic polymers, polyimides, acrylics, vinyl acrylics, styrene acrylics, polyvinyl alcohol, thermoplastic polyesters, thermosetting polyesters, poly (phenylene oxide), poly(phenylene sulfide), fluorinated polymers such as poly(tetrafluoroethylene), polyvinylidene fluoride, poly(vinylfluoride), chloro/fluoro copolymers such as ethylene chlorotrifluoro-ethylene copolymer, polyamide, phenolic resins, epoxy resins, polyurethane, acrylic/styrene acrylic copolymer latex, and silicone polymers.

In some embodiments, the polymeric binder comprises an acrylic/styrene acrylic copolymer latex, such as a hydrophobic styrene-acrylic emulsion. In some embodiments, the binder is selected from acrylic/styrene copolymer latex, a styrene-butadiene copolymer latex, a polyurethane, and mixtures thereof. In some embodiments, the binder comprises an acrylic/styrene copolymer latex and polyurethane dispersion.

In certain embodiments, the binder, or mixture of binders, is present from about 5 wt. % to about 50 wt. %, based on the total weight of the hydrocarbon adsorbent when dried and deposited onto the substrate. In certain embodiments, the polymeric binder is present from about 5 wt. % to about 30 wt. %, about 10 wt. % to about 30 wt. %, from about 15 wt. % to about 30 wt. %, from about 5 wt. % to about 25 wt. %, from about 5 wt. % to about 20 wt. %, from about 5 wt. % to about 15 wt. %, from about 10 wt. % to about 20 wt. %, or from about 15 wt. % to about 20 wt. %.

In some embodiments, the organic binder can have a low glass transition temperature. Transition temperature is conventionally measured by differential scanning calorimetry (DSC) by methods known in the art. An exemplary hydrophobic styrene-acrylic emulsion binder having a low transition temperature is RHOPLEX' P-376. In some embodiments, the binder has a transition temperature less than about 0° C. An exemplary binder having a transition temperature less than about 0° C. is RHOPLEX' NW-1715K (RHOPLEX™ brand products are available from Dow). In some embodiments, the binder is an alkyl phenol ethoxylate (APEO)-free, ultra-low formaldehyde, styrenated acrylic emulsion. One such exemplary binder is Joncryl® 2570. In some embodiments, the binder is an aliphatic polyurethane dispersion. One such exemplary binder is Joncryl® FLX 5200 (Joncryl® brand products are available from BASF).

Further Exemplary Additives

In some embodiments, the hydrocarbon adsorbent may contain additional additives, such as thickeners, dispersants, surfactants, biocides, antioxidants, and the like, which may be added to the slurry prior to forming the hydrocarbon adsorbent on the substrate. A thickener, for example, makes it possible to achieve a sufficient amount of coating on relatively low surface area substrates. The thickener may also serve in a secondary role by increasing slurry stability by steric hindrance of the dispersed particles. It may also aid in the binding of the coating surface. Exemplary thickeners include xanthan gum thickener or a carboxymethyl-cellulose thickener. Kelzan® CC (available from CP Kelco) is one such exemplary xanthan thickener.

In some embodiments, a dispersant is used in combination with the binder. The dispersant may be anionic, cationic, or non-ionic, and may be utilized in an amount of about 0.1 wt. % to about 10 wt. %, based on the weight of the hydrocarbon adsorbent. Suitable dispersants include, but are not limited to, polyacrylates, alkoxylates, carboxylates, phosphate esters, sulfonates, taurates, sulfosuccinates, stearates, laureates, amines, amides, imidazolines, sodium dodecylbenzene sulfonate, sodium dioctyl sulfosuccinate, and mixtures thereof. In some embodiments, the dispersant is a low molecular weight polyacrylic acid in which many of the protons on the acid are replaced with sodium. In some embodiments, the dispersant is a polycarboxylate ammonium salt. In some embodiments, the dispersant is a hydrophobic copolymer pigment dispersant. An exemplary dispersant is Tamol™ 165A (Trademark of Dow Chemical). While increasing the slurry pH or adding anionic dispersant alone may provide enough stabilization for the slurry mixture, improved results may be obtained when both an increased pH and anionic dispersant are used. In some embodiments, the dispersant is a non-ionic surfactant such as Surfynol® 420 (Air Products and Chemicals, Inc). In some embodiments, the dispersant is an acrylic block copolymer such as Dispex® Ultra PX 4575 (BASF).

In some embodiments, it is preferred to use a surfactant, which can act as a defoamer. In some embodiments, the surfactant is a low molecular non-anionic dispersant. An exemplary oil-free and silicone-free defoamer surfactant is Rhodoline® 999 (Solvay). Another exemplary surfactant is a blend of hydrocarbons and non-ionic surfactants, such as Foammaster® NXZ (BASF).

ILLUSTRATIVE EXAMPLES

The following examples are set forth to assist in understanding the disclosure and should not, of course, be construed as specifically limiting the embodiments described and claimed herein. Such variations of the embodiments, including the substitution of all equivalents now known or later developed, which would be within the purview of those skilled in the art, and changes in formulation or minor changes in experimental design, are to be considered to fall within the scope of the embodiments incorporated herein.

Example 1: Preparation of Monolith Coated with a Zeolite 298.8 g of water was mixed with Zeolite 3 from Example 5 (below) and the combination was mixed thoroughly with a Ross high-shear mixer. The resulting suspension was then milled with an Eiger continuous mill until the d90 particle size was 17.8 microns. 50.59 g of a 30% zirconium acetate solution and 2 drops of octanol were then mixed in to form the final slurry.

A cylindrical ceramic monolith substrate (230 cells per square inch) of 29×100 mm (cylinder diameter×length) was dipped into the slurry. Excess slurry was removed by clearing the channels using an air-knife operated at a pressure of 55 psi. The substrate was dried at 110° C. for 1 hour and then calcined in air at 300° C. for 3 hours. The final loading of the coating on the substrate was 1.76 g/in$^3$.

Comparative Example 1

A commercially available extruded carbon-based bleed emission trap of 29×100 mm (cylinder diameter×length) and with 200 cells per square inch was tested as is described below. The carbon content was determined by loss-on-ignition (LOI) to be 31.8 wt. %. The total weight of the monolith was about 28 g. This carbon content was used to plot the measured pore volume in Example 2 below.

Example 2: Measurement of Pore Size Distribution

Nitrogen pore size distribution and surface area analysis were performed on Micromeritics TriStar 3000 series instruments. The material to be tested was degassed for a total of 6 hours (a 2-hour ramp to 300° C., then a hold at 300° C. for 4 hours, under a flow of dry nitrogen) on a Micromeritics SmartPrep degasser. Nitrogen BET surface area was determined using 5 partial pressure points between 0.08 and 0.20. The nitrogen pore size was determined using the BJH calculations and 33 desorption points.

Figure 4A:
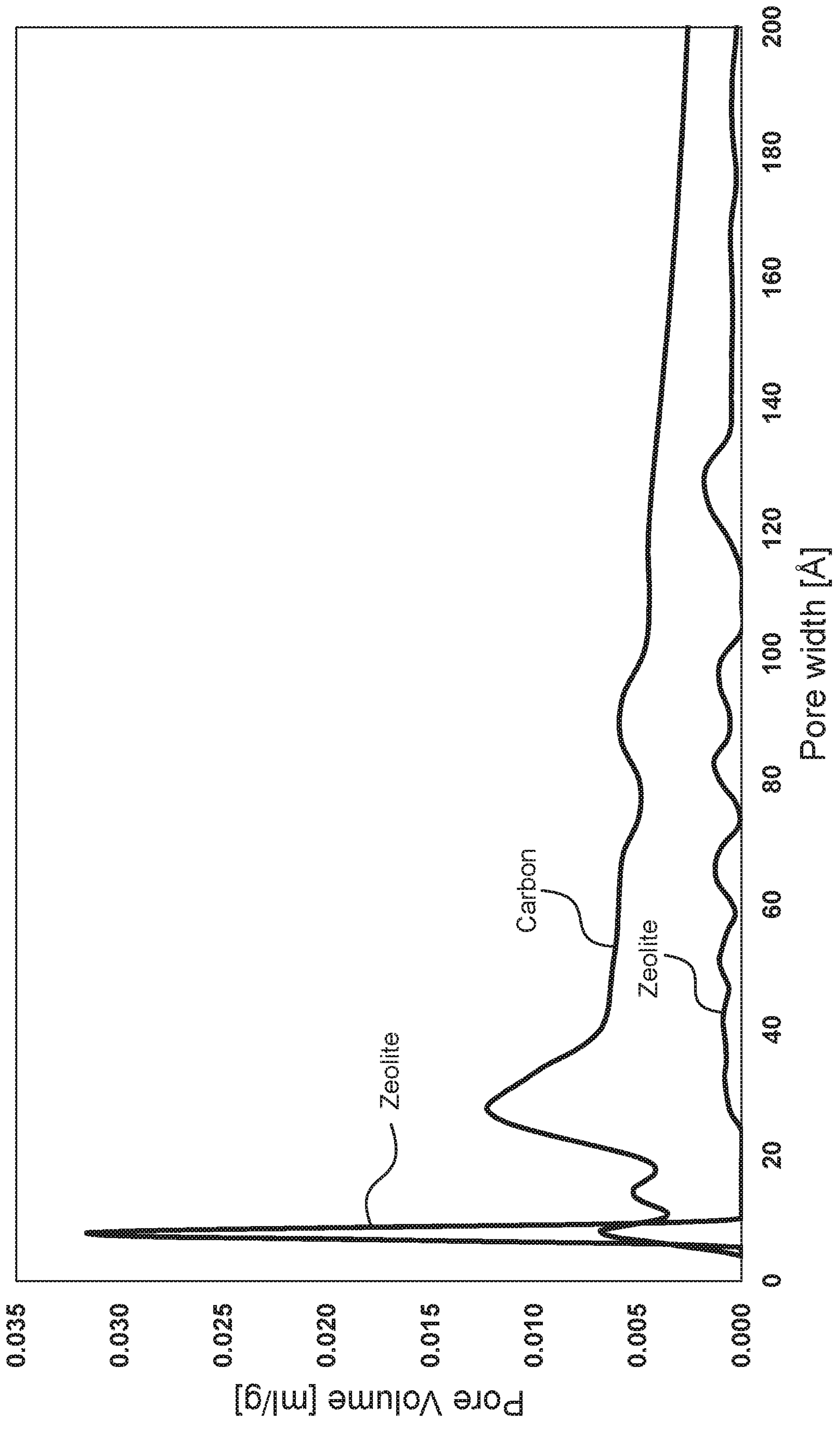
FIG. 4A is a plot illustrating pore volume as a function of pore width for different adsorbent materials discussed herein.
Figure 4B:
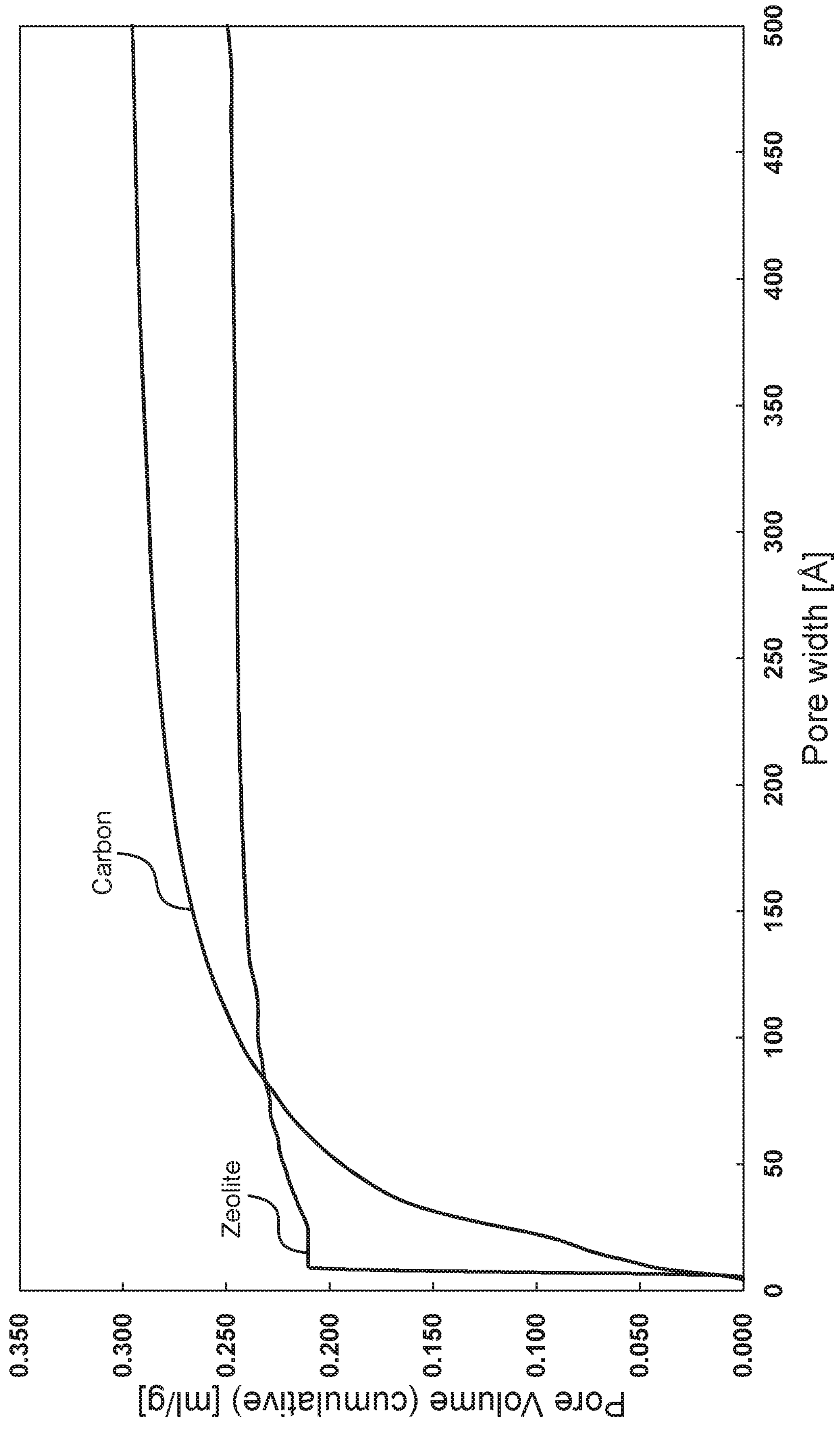
FIG. 4B is a plot illustrating cumulative pore volume as a function of pore width for the different adsorbent materials discussed herein.

FIG. 4A shows the pore size distribution of a beta zeolite (Zeolite 3 from Example 5) versus the commercially-available monolith carbon, and FIG. 4B shows the corresponding cumulative pore size distribution. In this graph can be seen the relatively lower amount of mesopores that are present in Zeolite 3, yet still has a significant amount of micropores.

Example 3: Measurement of Butane Isotherms

A butane isotherm measurement measures the adsorbed amount of butane in a sample material as a function of the partial pressure of butane. Butane is introduced incrementally into the evacuated sample, allowed to reach equilibrium, and the adsorbed mass is measured. The procedure used for this is example is as follows: an approximately 0.1 g sample of material is degassed under vacuum at 120° C. for 960 minutes, and the butane isotherm was measured using a 3Flex High Resolution High-throughput Surface Characterization Analyzer. The adsorptive test gas used is butane and the backfill gas used is nitrogen. During the analysis, a temperature of 298 K is maintained with a circulating bath of a water and antifreeze mixture. Low pressure dose amounts are 0.5 cc/g up to 0.000000100 $p/p_0$, and 3.0 cc/g up to 0.001 $p/p_0$. An equilibration interval of 30 seconds is used up to 0.001 $p/p_0$, and an equilibration interval of 10 seconds is used for the rest of the isotherm.

Figure 5:
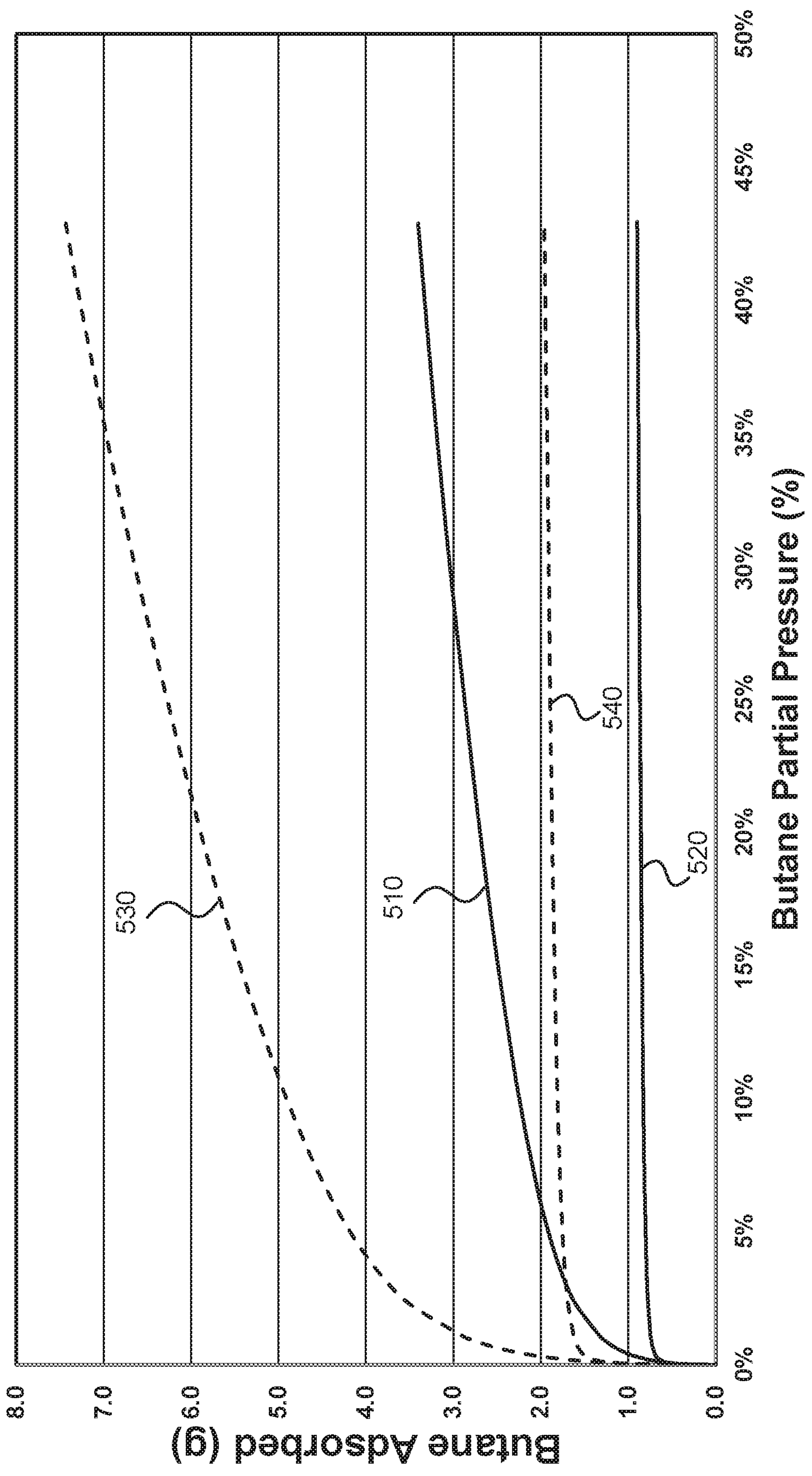
FIG. 5 is a plot illustrating amount of adsorbed butane as a function of partial pressure for different adsorbent materials discussed herein.

FIG. 5 shows the butane isotherm of Zeolite 3 versus the commercially-available monolith carbon. In this plot, both materials have been sized to show the total amount of butane adsorbed for scrubbers of both 29×100 mm and 35×150 mm (cylinder diameter×length) in size (curve 510: commercially-available 29×100 mm scrubber; curve 520: Zeolite 3 29×100 mm scrubber; curve 530: commercially available 35×150 mm scrubber; curve 540: Zeolite 3 29×100 mm scrubber). This plot shows that even the 35×150 mm scrubber coated with Zeolite 3 has a butane adsorption capacity at high butane concentrations that is much lower than the commercially available monolith carbon but still has a relatively high butane adsorption capacity at low concentrations typically encountered during the BETP test compared to the comparative example.

At low butane concentrations, the butane adsorbs into only the very small micropores of the adsorbent material. At higher butane concentrations, the butane adsorbs into the larger mesopores as well. Without wishing to be bound by theory, it is believed that the adsorption into the larger mesopores explains why the butane isotherm curve continually rises from lower concentrations of butane to higher concentrations for materials, since these materials contain significant amounts of both micropores and mesopores.

Example 4: Measurement of Butane Adsorption Capacity

The 29×100 mm (cylinder diameter×length) cylindrical sample is placed inside a cylindrical sample cell oriented in the vertical direction. The sample cell was then loaded with a 1:1 butane/$N_2$ test gas flow rate of 134 mL/min (10 g/hour of butane flow) for 45 minutes. The direction of flow was upward from the bottom of the sample cell to the top. The gas composition of the outlet flow from the sample cell was monitored by an FID (Flame Ionization Detector).

After the 45-minute butane adsorption step, the sample cell was purged with $N_2$ at 100 mL/min for 10 minutes in the same flow direction. The sample was then desorbed with a 10 L/min flow of air in the opposite direction (top to bottom) for 15 minutes. In the following step, the gas composition was switched to a mixture of 0.5% butane/$N_2$ at 134 mL/min (0.1 g butane per hour) and the loading step was repeated. The breakthrough curve was recorded using the FID described above and the signal was plotted against the cumulative mass of butane flowing.

The relative effective butane adsorption capacity can be correlated to the time it takes for butane breakthrough to occur through the sample. Butane breakthrough point is arbitrarily defined as the point at which the outlet concentration of butane from the sample cell reached 25% of the saturation concentration. Table 1 compares the amount of butane adsorbed at the butane breakthrough point for Example 1 vs. Comparative Example 1 at both 50% butane and 0.5% butane. The amount of butane adsorbed is calculated based on the butane flow rate. By this test, Example 1 has a relative butane adsorption capacity of only 19.3% at 50% butane, but a relative butane adsorption capacity of 70.5% at 0.5% butane compared to Comparative Example 1, demonstrating its relatively higher adsorption capacity at low concentrations.

TABLE 1

Butane Breakthrough point at 50% butane and 0.5% butane (balance Nitrogen)

| Sample | Butane Breakthrough at 50% butane | Butane Breakthrough at 0.5% butane |
|---|---|---|
| Example 1 | 503 mg | 321 mg |
| Comparative Example 1 | 2,611 mg | 455 mg |

Example 5: Measurement of Butane Adsorption in the Presence of Humidity

This test protocol measures the amount of butane a sample material will repeatedly adsorb and desorb in the presence of humidity. The results of this test can be used to predict the relative performance of adsorbent materials used in canister scrubbers in evaporative emission control applications since these materials are required to repeatedly adsorb and desorb primarily light hydrocarbon vapors at low concentrations and are exposed to ambient conditions where humidity is present. Without wishing to be bound by any particular theory, the water molecules present will compete with butane for the adsorption sites in the zeolite and will therefore decrease the adsorption capacity of the material relative to its performance under dry conditions.

The procedure used for this is example is as follows: an approx. 15 mg sample of the test material is loaded onto a TA Instruments Q50 thermogravimetric analysis (TGA) unit and purged with humid nitrogen for two hours at 42° C. The gas flow of 50 mL/min is supplied by a gas mixer which combines two separate gas flows into a single controlled stream, and is then limited by the instrument to 50 mL/min. A first nitrogen flow stream flows at 43 mL/min through a water bubbler held at 20° C. which delivers a constant humidity level of 27% at 42° C. to the sample at the final 50 mL/min flow rate. A second flow stream delivers dry nitrogen at 7 mL/min. After the 2-hour purge, a valve is switched so that the second flow at 7 mL/min delivers a stream of 3.5% butane in dry nitrogen which is diluted to 0.5% butane at 50 mL/min after mixing with the 43 mL/min humid nitrogen flow before reaching the sample. The sample is loaded with the 0.5% butane flow for three hours, and then the humid nitrogen flow without butane is restored to desorb the sample for 25 minutes. In this way, the sample is loaded with butane and purged for a total of three cycles. The sample temperature is held constant at 42° C. and the mass of the sample is measured during the entirety of the test.

In a typical test for a zeolite adsorbent material, the amount of butane adsorbed, given as the weight percent increase (wt. %) in mass of the sample due to the adsorption of butane, is higher during the first adsorption cycle than the second and third adsorption cycle. The mass gain during the second and third adsorption cycle are typically similar. This is because the 25-minute desorption step desorbs a relatively constant amount of butane and is not sufficiently long enough to desorb the material of butane completely. In some cases, the sample is not fully saturated with butane after the first adsorption cycle due to slow adsorption kinetics.

Figure 6:
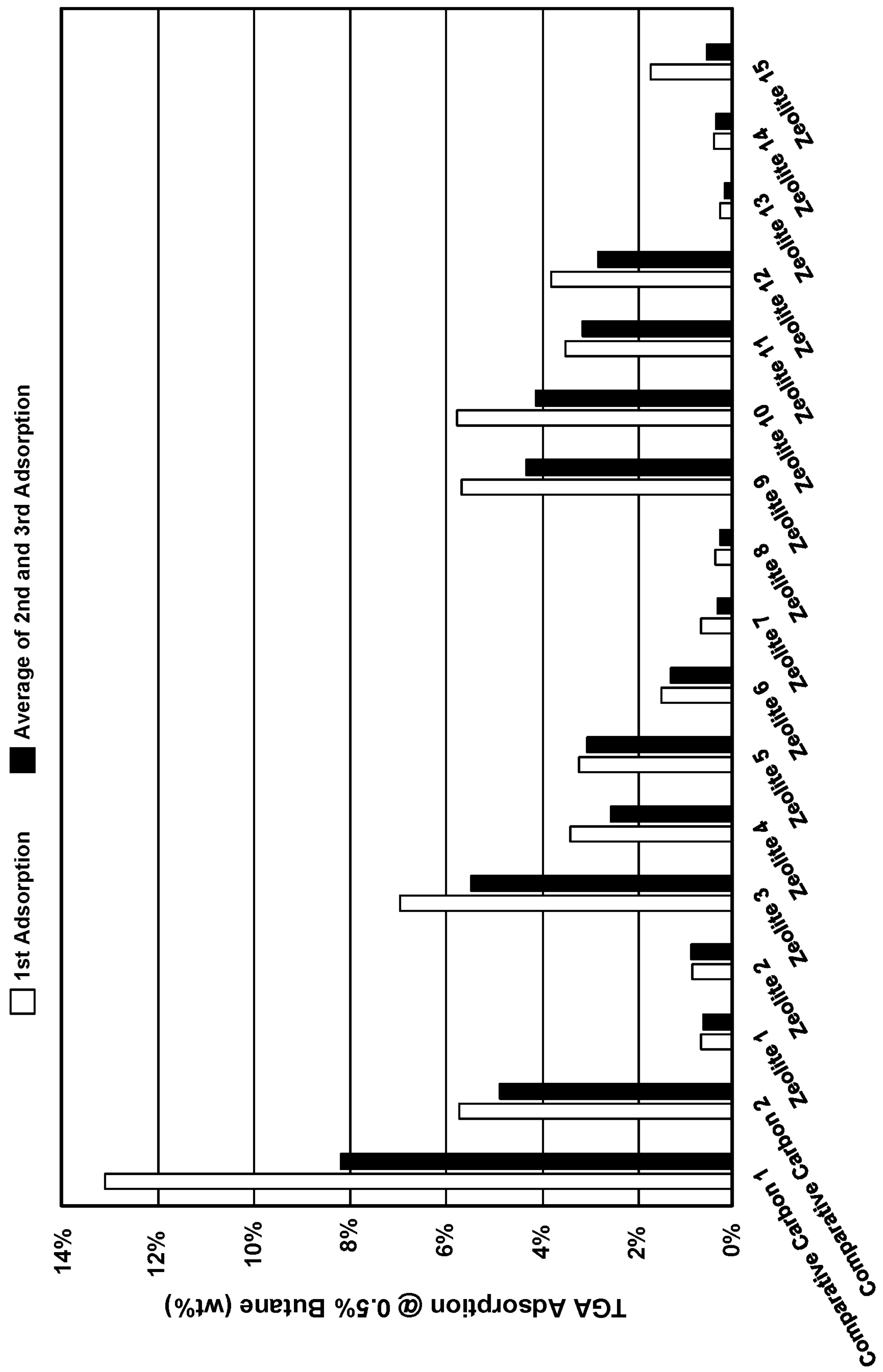
FIG. 6 is a plot illustrating butane adsorption performance for various zeolites compared to carbon adsorbents.

Fifteen samples of zeolites were tested using this procedure. Two comparative carbon samples were also tested and included for reference. Both comparative carbons are activated carbon materials that are used in hydrocarbon adsorbent coatings. The bar chart in FIG. 6 and Table 2 below show the results, as well as several important physical characteristics of the zeolites that were tested which can be correlated to the butane adsorption performance. The bar chart shows the relative amount of butane adsorbed (a) during the first adsorption cycle, and (b) the average of the second and third adsorption cycle which in all cases were within a few percentage points of each other. This value is referred to herein as the "repeatable TGA butane adsorption." The most important indicator for good performance of a material tested by this method in a canister scrubber application is a high value for the repeatable TGA butane adsorption. This value takes into account both a high adsorption capacity and efficient load and purge kinetics. From the physical material properties of these materials listed, it can be seen that several physical properties can be correlated to high performance by this metric, including a high silica-to-alumina ratio (SAR). Without wishing to be bound by any particular theory, this is because butane prefers to adsorb in the silicon adsorption sites in the crystalline matrix of zeolite structures. The zeolite must also have a three-dimensional pore network with a pore size that is large enough to adsorb butane. For reference, the kinetic diameter of butane is 4.5 Å. Smaller pore sizes will not readily admit butane into them to desorb.

Without wishing to be bound by any particular theory, the uniform pore sizes of zeolites may also represent an advantage in canister scrubber applications in terms of heel build, as they will not allow the adsorption of the larger volatile components of fuel vapors (e.g. isooctane, xylenes) thought to be primarily responsible for heel formation as a result of fuel vapor aging due to this same size exclusion principal. There is also a preference for the ion form of zeolite to be in the proton (H+) form over the ammonium (NH+) form. Without wishing to be bound by any particular theory, this is because protons take up less room in the pores of the zeolite than ammonium ions. Zeolites in their ammonium form can be converted into their proton form by calcining the material at 550° C. for 6 hours in air.

Based on these results, it can be seen that Zeolite 3 is predicted to be an exemplary performing material in canister scrubber applications. This material is also the zeolite material that is used in the previous examples above.

TABLE 2

Zeolites Tested for Butane Adsorption in the Presence of Humidity and their Relevant Physical Properties

| Sample Name | Type | 3-letter Code | Pore Network Type | Structural Pore Size (Å) | Ion Form |
|---|---|---|---|---|---|
| Comparative Carbon 1 | — | — | — | — | — |
| Comparative Carbon 2 | — | — | — | — | — |
| Zeolite 1 | Faujasite | FAU | 3-D | 7.4 | H+ |
| Zeolite 2 | Faujasite | FAU | 3-D | 7.4 | H+ |
| Zeolite 3 | Beta | BEA | 3-D | 6.7 | H+ |
| Zeolite 4 | Beta | BEA | 3-D | 6.7 | H+ |
| Zeolite 5 | Beta | BEA | 3-D | 6.7 | H+ |
| Zeolite 6 | Beta | BEA | 3-D | 6.7 | NH4+ |
| Zeolite 7 | Ferrierite | FER | 2-D | 4.7 | H+ |
| Zeolite 8 | Ferrierite | FER | 2-D | 4.7 | H+ |
| Zeolite 9 | ZSM-5 | MFI | 3-D | 4.5 | H+ |
| Zeolite 10 | ZSM-5 | MFI | 3-D | 4.5 | NH4+ |
| Zeolite 11 | ZSM-5 | MFI | 3-D | 4.5 | H+ |
| Zeolite 12 | ZSM-5 | MFI | 3-D | 4.5 | NH4+ |
| Zeolite 13 | ZSM-5 | MFI | 3-D | 4.5 | H+ |
| Zeolite 14 | ZSM-5 | MFI | 3-D | 4.5 | NH4+ |
| Zeolite 15 | Chabazite | CHA | 3-D | 3.7 | H+ |

| Sample Name | Silica to Alumina Ratio (SAR) | BET Surface Area ($m^2/g$) | t-Plot Micropore Volume ($cm^3/g$) | TGA Butane Adsorption (wt. %, first cycle) | Repeatable TGS Butane Adsorption (wt. %) |
|---|---|---|---|---|---|
| Comparative Carbon 1 | — | — | — | 13.10% | 8.18% |
| Comparative Carbon 2 | — | — | — | 5.72% | 4.89% |
| Zeolite 1 | 80 | 635 | .207 | 0.72% | 0.68% |
| Zeolite 2 | 30 | 795 | .262 | 0.89% | 0.91% |
| Zeolite 3 | 500 | 477 | .189 | 6.96% | 5.50% |
| Zeolite 4 | 150 | 592 | .204 | 3.41% | 2.58% |
| Zeolite 5 | 20 | 575 | .168 | 3.24% | 3.06% |
| Zeolite 6 | 20 | 576 | .166 | 1.54% | 1.33% |
| Zeolite 7 | 55 | 282 | .114 | 0.43% | 0.25% |
| Zeolite 8 | 20 | 321 | .132 | 0.59% | 0.38% |
| Zeolite 9 | 280 | — | — | 5.67% | 4.34% |
| Zeolite 10 | 280 | 366 | .079 | 5.79% | 4.16% |
| Zeolite 11 | 80 | — | — | 3.55% | 3.18% |
| Zeolite 12 | 80 | 408 | .118 | 3.83% | 2.87% |
| Zeolite 13 | 23 | — | — | 0.31% | 0.23% |
| Zeolite 14 | 23 | 330 | .280 | 0.43% | 0.39% |
| Zeolite 15 | 25 | 636 | .279 | 1.35% | 0.61% |

In the foregoing description, numerous specific details are set forth, such as specific materials, dimensions, processes parameters, etc., to provide a thorough understanding of the embodiments of the present disclosure. The particular features, structures, materials, or characteristics may be combined in any suitable manner in one or more embodiments. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the use of the terms "a," "an," "the," and similar referents in the context of describing the materials and methods discussed herein (especially in the context of the following claims) are to be construed to cover both the singular and the plural, unless otherwise indicated herein or clearly contradicted by context.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Reference throughout this specification to "one embodiment," "certain embodiments," "one or more embodiments," "an embodiment," or "some embodiments" means that a particular feature, structure, material, or characteristic described in connection with the embodiment is included in at least one embodiment of the present disclosure. Thus, the appearances of the phrases such as "in one or more embodiments," "in certain embodiments," "in one embodiment," or "in an embodiment" in various places throughout this specification are not necessarily referring to the same embodiment of the present disclosure. Furthermore, the particular features, structures, materials, or characteristics may be combined in any suitable manner in one or more embodiments.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled. The use of any and all examples, or exemplary language (e.g., "such as") provided herein, is intended merely to better illuminate the materials and methods and does not pose a limitation on the scope unless otherwise claimed. No language in the specification should be construed as indicating any non-claimed element as essential to the practice of the disclosed materials and methods.

Although the embodiments disclosed herein have been described with reference to particular embodiments it is to be understood that these embodiments are merely illustrative of the principles and applications of the present disclosure. It will be apparent to those skilled in the art that various modifications and variations can be made to the method and apparatus of the present disclosure without departing from the spirit and scope of the disclosure. Thus, it is intended that the present disclosure include modifications and variations that are within the scope of the appended claims and their equivalents, and the above-described embodiments are presented for purposes of illustration and not of limitation.

What is claimed is:

1. A hydrocarbon adsorbent structure comprising:

a substrate comprising a ceramic monolith; and a hydrocarbon adsorbent formed on the ceramic monolith, the hydrocarbon adsorbent comprising a zeolite having a silica-to-alumina ratio of at least 100, wherein:

the average pore width of the zeolite is between 2.0 and 6.7 Å, the zeolite is in the form of milled particles characterized by an average d90 particle size from 20 micrometers to about 50 micrometers, and micropores of the zeolite account for at least 70% of a total pore volume of the zeolite.

2. The hydrocarbon adsorbent structure of claim 1, wherein the silica to alumina ratio is in the range of from 100 to 600.

3. The hydrocarbon adsorbent structure of claim 1, wherein the zeolite comprises a zeolite selected from a group consisting of: AEI, BEA, BEC, CHA, EMT, FAU, FER, MFI, and combinations thereof.

4. The hydrocarbon adsorbent structure of claim 1, wherein a loading of the hydrocarbon adsorbent coating on the substrate ranges from about 0.5 $g/in^3$ to about 2.0 $g/in^3$, and wherein a thickness of the hydrocarbon adsorbent coating is less than about 500 micrometers.

5. The hydrocarbon adsorbent structure of claim 1, wherein the hydrocarbon adsorbent coating comprises a binder, wherein the binder comprises a styrene/acrylic copolymer, and wherein the binder is present in an amount from about 5 wt. % to about 50 wt. % based a total weight of the hydrocarbon adsorbent coating.

6. The hydrocarbon adsorbent structure of claim 1, wherein the hydrocarbon adsorbent coating further comprises activated carbon.

7. A bleed emission scrubber comprising an adsorbent volume, at least one adsorbent volume comprising at least one hydrocarbon adsorbent structure of claim 1.

8. An air intake system comprising at least one hydrocarbon adsorbent structure of claim 1.

9. A cabin air purification system comprising at least one hydrocarbon adsorbent structure of claim 1.

10. An evaporative emission control canister comprising:

one or more adsorbent volumes located within or external to the evaporative emission control canister; and at least one bleed emission scrubber contained within the adsorbent volume of the evaporative emission control canister and fluidly coupled thereto, wherein each bleed emission scrubber comprises at least one hydrocarbon adsorbent structure of claim 1.

11. The evaporative emission control canister of claim 10, wherein the bleed emission scrubber is incorporated into an evaporative emission control canister system having a canister volume of 3.5 L or less wherein a volume of the bleed emission scrubber or the hydrocarbon adsorbent structure is less than 4 dL, and wherein at least a portion of micropores of the zeolite exhibit a pore volume of greater than 0.01 mL/g.

12. An evaporative emission control system comprising:

a fuel tank for fuel storage;

an engine adapted to receive and consume fuel from the fuel tank; and an evaporative emission control canister system fluidly coupled to the engine, the evaporative emission control canister system comprising:

at least one bleed emission scrubber fluidly coupled to an evaporative emission control canister, wherein the at least one bleed emission scrubber comprises an adsorbent volume, the adsorbent volume comprising at least one hydrocarbon adsorbent structure of any of claim 1.

13. An evaporative emission control system comprising:

a fuel tank for fuel storage;

an engine adapted to receive and consume fuel from the fuel tank; and an evaporative emission control canister system fluidly coupled to the engine, the evaporative emission control canister system comprising:

at least one bleed emission scrubber fluidly coupled to an evaporative emission control canister, wherein the bleed emission scrubber comprises an adsorbent volume, the adsorbent volume comprising at least one hydrocarbon adsorbent structure comprising a zeolite having a silica-to-alumina ratio of at least 20, wherein the repeatable TGA butane adsorption of the zeolite is greater than 2 wt. %.

* * * * *